United States Patent
Dai et al.

(10) Patent No.: US 11,007,650 B2
(45) Date of Patent: May 18, 2021

(54) ROBOT PROCUREMENT APPARATUS AND ROBOT PROCUREMENT METHOD

(71) Applicant: HITACHI, LTD., Tokyo (JP)

(72) Inventors: Jingze Dai, Tokyo (JP); Hideya Yoshiuchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 302 days.

(21) Appl. No.: 15/934,290

(22) Filed: Mar. 23, 2018

(65) Prior Publication Data

US 2019/0061166 A1 Feb. 28, 2019

(30) Foreign Application Priority Data

Aug. 23, 2017 (JP) .............................. JP2017-160066

(51) Int. Cl.

| | |
|---|---|
| *G05B 19/418* | (2006.01) |
| *B25J 13/00* | (2006.01) |
| *B25J 9/16* | (2006.01) |
| *G05D 1/00* | (2006.01) |
| *G05D 1/02* | (2020.01) |

(Continued)

(52) U.S. Cl.
CPC ........... *B25J 13/006* (2013.01); *B25J 9/0084* (2013.01); *B25J 9/161* (2013.01); *B25J 9/1661* (2013.01); *B25J 11/008* (2013.01); *B25J 19/005* (2013.01); *G05D 1/0027* (2013.01);
(Continued)

(58) Field of Classification Search
CPC ...... B25J 13/006; B25J 11/008; B25J 9/0084; B25J 19/005; B25J 9/1661; B25J 9/161; G05D 1/0297; G05D 1/0291; G05D 1/0027; G05D 2201/0217; G05B 2219/40202
See application file for complete search history.

(56) References Cited

U.S. PATENT DOCUMENTS

| | | | |
|---|---|---|---|
| 2007/0239635 A1* | 10/2007 | Yoshiike | G06N 3/02 706/15 |
| 2014/0365258 A1* | 12/2014 | Vestal | G06Q 10/063114 705/7.15 |

(Continued)

FOREIGN PATENT DOCUMENTS

| | | |
|---|---|---|
| JP | 2006-198730 A | 8/2006 |
| JP | 2009-028831 A | 2/2009 |

(Continued)

OTHER PUBLICATIONS

Japanese Office Action dated Jan. 5, 2021 for Japanese Patent Application No. 2017-160066.

*Primary Examiner* — Harry Y Oh
*Assistant Examiner* — Sohana Tanju Khayer
(74) *Attorney, Agent, or Firm* — Volpe Koenig

(57) ABSTRACT

A robot procurement apparatus stores a deficient or surplus number of robots in each of service areas where robots provide services and performs a procurement process of determining a procurement target robot to a dispatch destination service area that is the service area to which the robot is to be dispatched based on the deficient or surplus number of robots in the dispatch destination service area and the deficient or surplus number of robots in any service area other than the dispatch destination service area. The robot procurement apparatus sets the deficient or surplus number of robots in each of the service areas based on load of the robot in the service area.

18 Claims, 26 Drawing Sheets

(51) Int. Cl.
    *B25J 19/00*     (2006.01)
    *B25J 9/00*     (2006.01)
    *B25J 11/00*     (2006.01)

(52) U.S. Cl.
    CPC ......... *G05D 1/0291* (2013.01); *G05D 1/0297* (2013.01); *G05D 2201/0217* (2013.01)

(56) References Cited

U.S. PATENT DOCUMENTS

| | | | |
|---|---|---|---|
| 2018/0203462 A1* | 7/2018 | Sugiyama | G05D 1/0274 |
| 2020/0005420 A1* | 1/2020 | Wang | G06Q 50/30 |

FOREIGN PATENT DOCUMENTS

| | | |
|---|---|---|
| JP | 2011-245577 A | 12/2011 |
| JP | 2012-046309 A | 3/2012 |
| KR | 2010-0077653 A | 7/2010 |

\* cited by examiner

SERVICE AREA MANAGEMENT TABLE 331

| AREA ID 611 | ADJACENT AREA ID 612 | PRIORITY 613 | NUMBER OF ROBOTS 614 | NUMBER OF ROBOTS IN SERVICE 615 | NUMBER OF ROBOTS IN ROBOT DOCK 616 | NUMBER OF EMPTY SLOTS 617 | NUMBER OF ROBOTS IN PATROL 618 | NUMBER OF RESERVED ROBOTS 619 | AVERAGE BATTERY CONSUMPTION 620 | TOTAL PROCUREMENT TIME 621 | LOAD RATIO 622 | TARGET LOAD RATIO 623 | DEFICIENT AND SURPLUS NUMBER OF ROBOTS 624 |
|---|---|---|---|---|---|---|---|---|---|---|---|---|---|
| 1 | 2, 3 | 0.3 | 4 | 1 | 1 | 2 | 1 | 1 | 20% | 30 | 0.33 | 0.5 | 1 |
| 2 | 1 | 0.3 | 4 | 3 | 0 | 3 | 1 | 0 | 50% | 105 | 0.75 | 0.5 | -1 |
| 3 | 1 | 0.4 | 4 | 2 | 0 | 3 | 2 | 0 | 30% | 82 | 0.5 | 0.5 | 0 |

FIG. 6

ROBOT STATE TABLE 332

| ROBOT ID (711) | BATTERY CONSUMPTION (712) | CURRENT TASK (713) | CURRENT POSITION (714) | CURRENT AREA (715) | DISPATCH DESTINATION AREA (716) |
|---|---|---|---|---|---|
| 00001 | 15% | CHARGING | ROBOT DOCK 001_1 | 1 | - |
| 00002 | 70% | IN PATROL | (x,y,z) | 2 | - |
| 00003 | 50% | IN SERVICE | (x,y,z) | 3 | - |
| 00004 | 70% | MOVING TO DISPATCH DESTINATION | (x,y,z) | 3 | 2 |

FIG. 7

INITIAL PROCUREMENT
SETTING TABLE       333

| AREA ID (811) | TARGET NUMBER OF ROBOTS (812) |
|---|---|
| 1 | 2 |
| 2 | 4 |
| 3 | 3 |

FIG. 8

WEIGHT SETTING TABLE       134

| Wa (911) | Wb (912) | Wc (913) | Wd (914) |
|---|---|---|---|
| 0.2 | 0.2 | 0.2 | 0.2 |

FIG. 9

ROBOT DOCK STATE TABLE 231

| ROBOT DOCK ID 1011 | CHARGE SLOT ID 1012 | CHARGE SLOT STATE 1013 | ROBOT ID OCCUPYING CHARGE SLOT 1014 | INSTALLATION AREA 1015 |
|---|---|---|---|---|
| 001 | 001_1 | CHARGING | 0001 | 1 |
| 001 | 001_2 | EMPTY | — | 1 |
| 001 | 001_3 | EMPTY | — | 1 |
| 002 | 002_1 | CHARGED (STAND-BY) | 0010 | 2 |
| 002 | 002_2 | CHARGED (STAND-BY) | 0005 | 2 |

FIG. 10

PROCUREMENT REQUEST MESSAGE M1

| REQUEST SOURCE | DISPATCH DESTINATION | PROCUREMENT REQUEST | POSITION OF DISPATCH DESTINATION | MESSAGE ID |
|---|---|---|---|---|
| MOBILE TERMINAL ID | 2 | 1, PATROL | (x, y, z) | R12134 |

FIG. 19A

PROCUREMENT REQUEST MESSAGE M1

| REQUEST SOURCE | DISPATCH DESTINATION | PROCUREMENT REQUEST | POSITION OF DISPATCH DESTINATION | MESSAGE ID |
|---|---|---|---|---|
| ROBOT DOCK MANAGEMENT PART ID | 2 | 1, HANDOVER OF TASK OF ROBOT HAVING ROBOT ID "2" | (x, y, z) | R12145 |

FIG. 19B

PROCUREMENT REQUEST REPLY MESSAGE M2

| 2001 | 2002 | 2003 | 2004 |
|---|---|---|---|
| REPLY DESTINATION | MESSAGE ID | PROCUREMENT REQUEST REPLY | PROCUREMENT TIME |
| MOBILE TERMINAL ID | M10001 | IMPOSSIBLE | 0:05:00 |

FIG. 20

PROCUREMENT INSTRUCTION MESSAGE M3

| 2101 | 2102 | 2103 | 2104 | 2105 | 2106 |
|---|---|---|---|---|---|
| TRANSMISSION SOURCE | MESSAGE ID | PROCUREMENT TARGET ROBOT ID | DISPATCH DESTINATION AREA | POSITION OF DISPATCH DESTINATION | TASK |
| NON-ON-DEMAND PROCUREMENT PART | O10001 | 00001 | 1 | (x, y, z) | PATROL |

FIG. 21

ROBOT PROCUREMENT APPARATUS AND ROBOT PROCUREMENT METHOD

CROSS-REFERENCE TO RELATED APPLICATION

This application claims priority pursuant to 35 U.S.C. § 119 from Japanese Patent Application No. 2017-160066, filed on Aug. 23, 2017, the entire disclosure of which is incorporated herein by reference.

BACKGROUND

The present invention relates to a robot procurement apparatus and a robot procurement method.

Japanese Patent Application Laid-open Publication No. 2006-198730 states "Provided is a reception and guiding system including multiple mobile robots that are capable of simultaneously attending multiple visitors by taking their respective shares of tasks, moving between building floors by use of elevators, and working in rotation by exchanging their tasks between them", and "includes a mobile robot that includes a speech recognition unit configured to recognize human speech, a speech unit configured to speak a human-understandable language through speech synthesis, a mobile object configured to autonomously move in a space, a manipulator configured to handle objects, and an external communication unit configured to communicate with an external server; an elevator control server that controls elevators; a visitor detection device that detects visitors; and a visitor detection server that is coupled to the visitor detection device and controls the visitor detection device".

SUMMARY

Recently, research and development of robots have been accelerated and the robots has been put into practical use more frequently to provide services (such as attending customers, guiding, interpreting, caregiving, and interacting with customers) in various places such as commercial facilities (such as stores and banks) or public facilities (such as airports, stations, government offices, and hospitals). To cause the robots to work in place of humans for tasks that have been done by the humans so far is expected to bring about various effects of solving a problem in ensuring a workforce, reducing personnel costs, or doing the like.

In this regard, in the case of providing services by using multiple robots to multiple areas where the robots provide services (hereinafter referred to as service areas), for example, it is necessary to ensure the quality of the services (satisfaction, promptness, or the like) in each of the service areas and efficiently operate the multiple robots across the multiple service areas as a whole. Patent Document 1 cited above discloses the system in which multiple mobile robots simultaneously attend multiple visitors by taking their respective shares of tasks, but does not disclose a mechanism based on the viewpoints discussed above.

An objective of the disclosure is to provide a robot procurement apparatus and a robot procurement method that ensure the quality of services provided by robots and enable efficient operation of the robots dispatched in service areas.

One aspect of the present invention to achieve the objective mentioned above is a robot procurement apparatus including a storage unit that stores a deficient or surplus number of robots in each of multiple service areas where the robots provide services; and a procurement unit that performs a procurement process of determining a procurement target robot for a dispatch destination service area that is the service area where the robot is to be dispatched, based on the deficient or surplus number of robots in the dispatch destination service area and the deficient or surplus number of robots in any service area other than the dispatch destination service area.

Other problems and a method of solving the problems disclosed in this application are clarified by the detailed description of the invention and the drawings.

According to the present invention, it is possible to ensure the quality of services provided by robots and efficiently operate the robots dispatched to the service areas.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a diagram illustrating a main configuration that a robot is equipped with;

FIG. 3 is a diagram illustrating a main configuration that a robot dock is equipped with;

FIG. 6 is an example of a service area management table;

FIG. 7 is an example of a robot state table;

FIG. 8 is an example of an initial procurement setting table;

FIG. 9 is an example of a weight setting table;

FIG. 10 is an example of a robot dock state table;

FIG. 16 is a diagram illustrating communications to be performed when the procurement process is performed according to an event occurrence notice issued from the robot and based on information outputted from a sensor that the robot is equipped with;

FIG. 19A is an example of a procurement request message transmitted from the mobile terminal to the on-demand procurement part in FIG. 12; FIG. 19B is an example of the procurement request message transmitted from the robot dock management part to the on-demand procurement part in FIG. 13;

FIG. 20 is an example of a procurement request reply message;

FIG. 21 is an example of the procurement request message;

DETAILED DESCRIPTION OF EMBODIMENTS

Embodiments are described hereinafter with reference to the drawings. Note that in the following description, same or similar configurations are assigned with common symbols and overlapping descriptions may be omitted. Also note that a program may be expressed as "PG".

Figure 1:
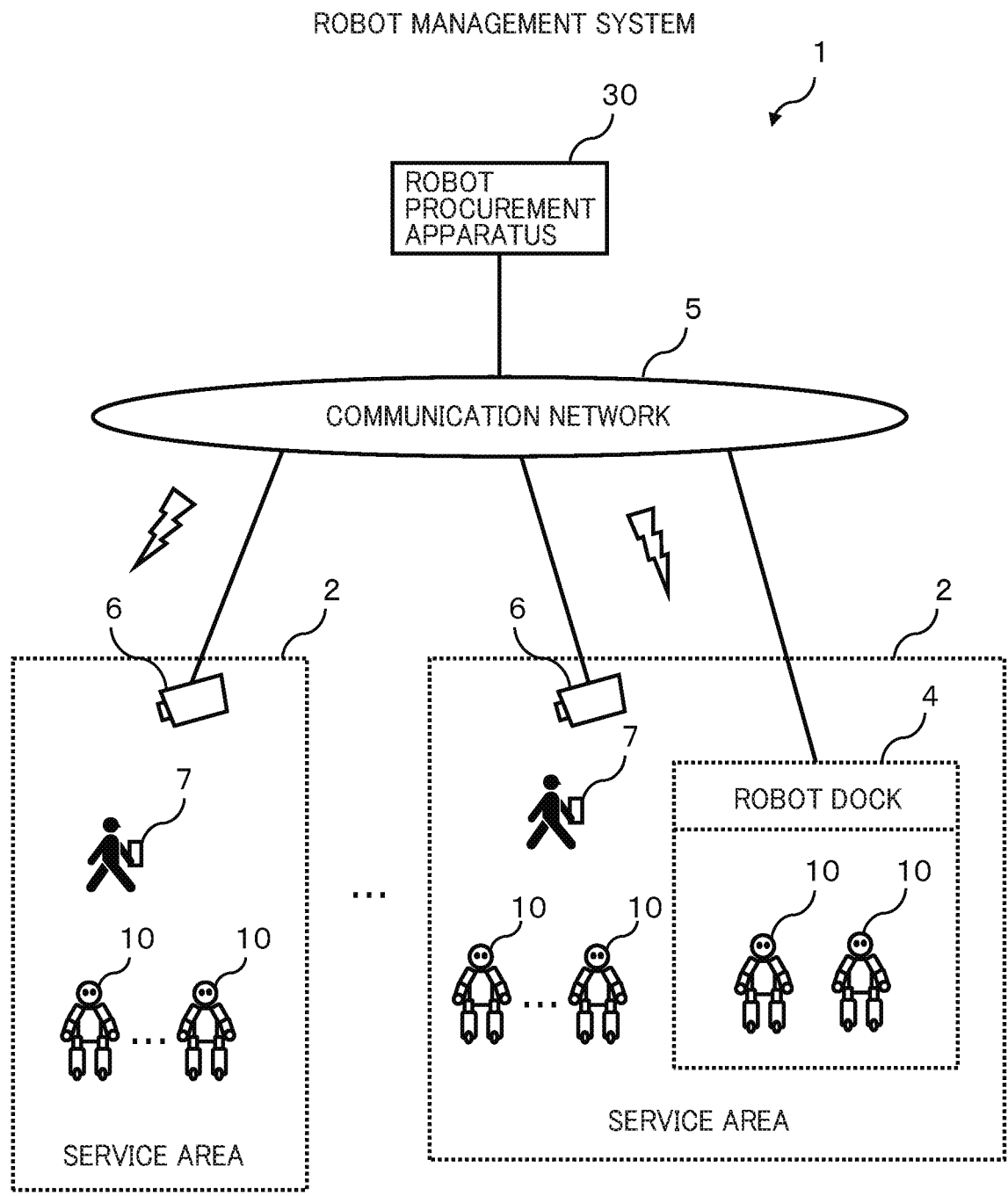
FIG. 1 is a diagram illustrating a schematic configuration of a robot management system.

FIG. 1 is a diagram illustrating a schematic configuration of a robot management system 1. The robot management system 1 manages procurement (assignment and dispatch) of multiple robots 10 to service areas 2, the multiple robots 10 playing roles of providing various types of interpersonal services (such as attending customers, guiding, interpreting, caregiving, and interacting with customers) to people (such as customers, visitors, and passers) in a site (hereinafter referred to as a service area) such as commercial facilities (shops or banks, or the like) or public facilities (airports, stations, government offices, hospitals, or the like).

As illustrated in FIG. 1, the robot management system 1 includes, as constituent elements, the multiple robots 10 that are present in the service areas 2, a robot procurement apparatus 30, a robot dock 4, mobile terminals 7 carried by people (customers, visitors, passers, guides, a manager of the robot management system 1, or the like) who are present in the service areas 2, and cameras 6 or the like provided in the respective service areas 2.

The configuration of these may communicate with each other via a wired or wireless communication network 5. The communication network 5 is equipment that achieves wired or wireless communications and is, for example, a LAN (Local Area Network), a WAN (Wide Area Network), Wi-Fi, Internet, various types of mobile communication networks, a leased line, or the like.

The mobile terminal 7 is a portable terminal device (smartphone, tablet, note-book computer, mobile phone, (personal digital assistant (PDA) device, or the like) and has functions as an information processor (computer) and a communication function. The mobile terminal 7 receives an instruction to procure the robot 10 via the user interface from a person.

The camera 6 is an image acquisition device including the information processing function and the communication function (for example, a device including a programmable camera or an image processing feature). Installed in the service areas 2, the camera 6 acquires shot images (such as moving images, intermittently acquired static images, or the like) of states in the service areas 2 (such as states of people or the robots 10 present in the service areas 2, crowded state, or the like) and provides the images to the robot procurement apparatus 30. Also, when detecting that any one present in the service areas 2 does a predetermined action (such as a gesture of raising a hand, or the like, walking around, stopping for a long time, or the like), the camera 6 generates an event occurrence notice and sends the notice to the robot procurement apparatus 30. Note that the camera 6 is simply an example of a sensor for knowing the states in the service areas 2 and that any other type of sensor may be used to know the states in the service areas 2. Alternatively, the states in the service areas 2 may be known by means of a combination of multiple sensor types from various standpoints.

The robot dock 4 includes a robot dock management device to be described below and charging equipment for the robot 10 (charging slots 41 to be descried below). Note that in this embodiment, all the robot docks 4 are provided in the service areas 2. Multiple robot docks 4 may be provided in one service area 2. The robot dock management device 20 receives operation input to instruct procurement of the robot 10 from a person present in the service area 2, for example. The robot dock management device 20 also selects the robot 10 to be provided to a dispatch destination, for example.

The robot procurement apparatus 30 performs a process related to procurement of the robots 10 (hereinafter referred to as a procurement process). The robot procurement apparatus 30 performs a passive procurement process (hereinafter referred to as an on-demand procurement process) based on a notice (signal) or a request sent from any of the cameras 6, the mobile terminals 7, and the robot docks 4. Note that a subject that makes the aforementioned notification or request which triggers the start of the on-demand procurement process is not necessarily limited. In addition, the robot procurement apparatus 30 performs an active procurement process (hereinafter referred to as a non-on-demand procurement process) depending on the states of the robots 10, the robot docks 4, and the service areas 2, for example.

Figure 2:
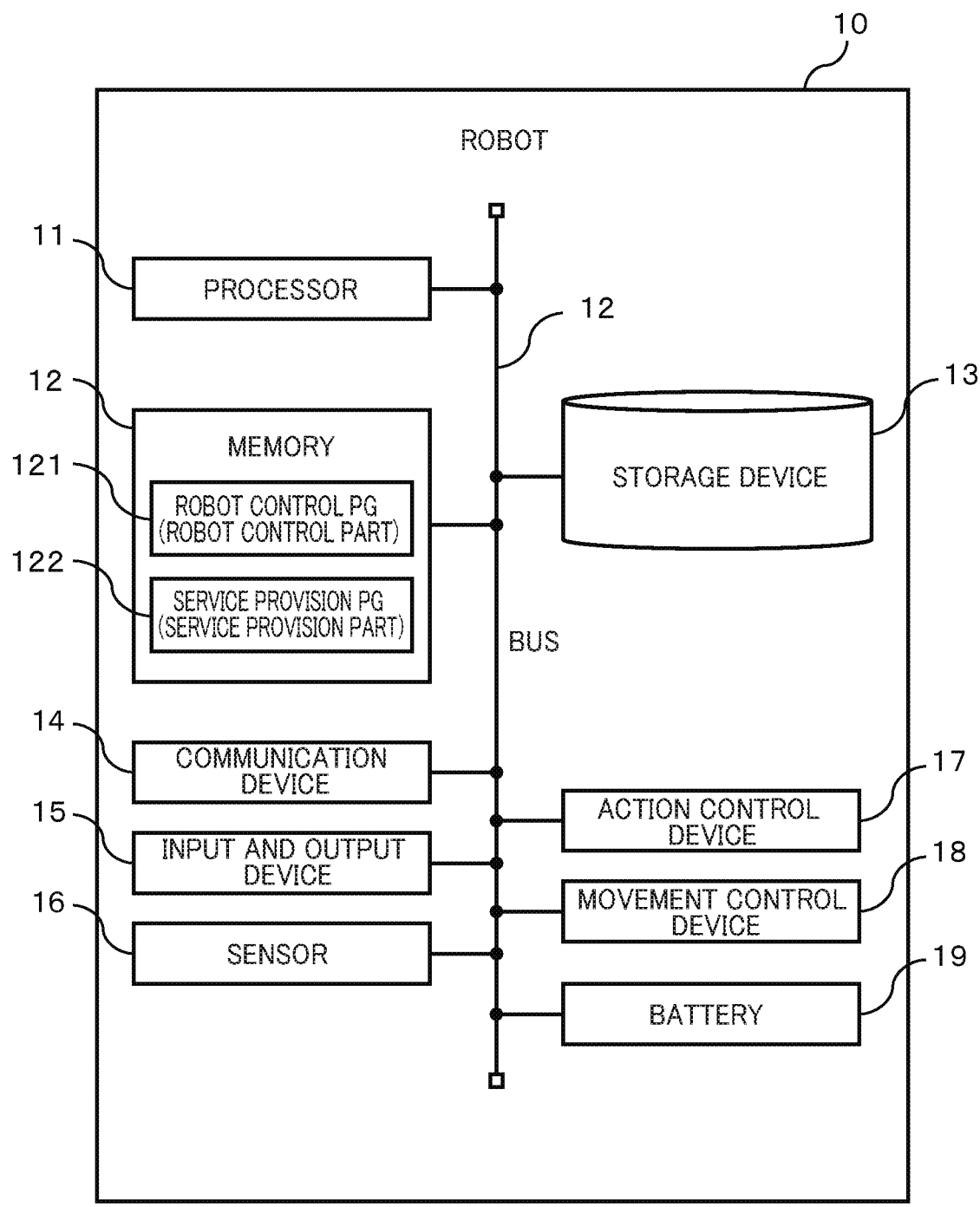

FIG. 2 illustrates a main configuration that a robot 10 is equipped with. As illustrated in FIG. 2, the robot 10 includes a processor 11, a memory 12, a storage device 13, a communication device 14, an input-output device 15, a sensor 16, an action control device 17, a movement control device 18, and a battery 19. Furthermore, the robot 10 may be entirely or partly configured with a virtual resource (such as a cloud server in a cloud system, or the like). The robot 10 may further have functions of an operating system or a database management system (DBMS).

The processor 11 is configured with a central processing unit (CPU) or a micro processing unit (MCU), or the like, for example. The processor 11 executing a program stored in the memory 12, various types of functions of the robot 10 are achieved.

The memory 12 is configured with a read only memory (ROM), a random access memory (RAM), a non-volatile memory (NVRAM), or the like. A storage device 13 is, for example, a solid state drive (SSD), a hard disk drive (HDD), an optical or magnetic storage device, or the like. Note that a distinction between the memory 12 and the storage device 13 is not necessarily strict, and that all or some of both may be achieved by common hardware.

The communication device 14 is a device that communicates with other devices by way of the communication network 5 in a wireless or wired manner. The communication device 14 is configured with a wireless module or a network interface card (NIC), for example.

The input-output device 15 includes an input device (a touch panel, a button, a keyboard, a reader of a storage medium (non-volatile memory, optical recording medium, magnetic recording medium, magnetooptical recording medium, or the like), or the like) that receives input of information from outside, and an output device (liquid crystal display (LCD), projector, light emitting diode (LED), or the like, printer, storage device of data to recording medium).

A sensor 36 is, for example, a camera, a distance (depth) sensor (time-of-flight (TOF: Time Of Flight) camera, stereo camera, or the like), a microphone, an optical sensor, an acceleration sensor, a gyroscope sensor, a gravity sensor, a magnetic sensor, a global positioning system (GPS) sensor, or the like. The microphone is used to acquire human voice, for example. The optical sensor or the camera is used to acquire information on human behavior or actions, for example. The acceleration sensor or the gyroscope sensor is used to know profile of the robot 10, for example. A position detecting sensor (such as a GPS sensor, or the like) is used to know a current position of the robot 10, for example. Note that the position detecting sensor is achieved through the use of various types of publicly known techniques for acquiring a current position indoors or outdoors, such as Wi-Fi or a technique utilizing a phase difference of multiple wireless signals.

The action control device 17 includes a control circuit (servo motor, actuator) for controlling actions of the robot 10 (motion of extremities or joints, expressions, speech, or the like) or a mechanical component (gear mechanism, link mechanism, or the like).

The movement control device 18 includes a drive circuit (motor drive circuit, or the like) for the robot 10 to move, or a drive mechanism (motor, servo motor, gear mechanism, or the like).

The battery 19 includes an electricity storage element (lithium-ion battery, lithium-ion polymer battery, lead storage battery, or the like) and a charge control circuit, and supplies the constituent elements of the robot 10 with electric power necessary for their actions.

As illustrated in FIG. 2, the memory 12 stores a robot control program (hereinafter referred to as a robot control PG 121) and a service provision program (hereinafter referred to as a service provision PG 122). These programs may be loaded from the storage device 13 to the memory 12, as needed. In the following, functions achieved by the robot control PG 121 and the service provision PG 122 being executed are referred to as a robot control part and a service provision part, respectively.

The robot control part is configured to perform control over actions, profile, movement, or the like of the robot 10. In cooperation with the robot control part, the service provision part performs various types of processes related to provision of services by the robot 10. In addition to an autonomous operation, the robot control part or the service provision part may perform a passive operation based on an instruction sent from an individual robot management part, to be described below, via the communication device 14. In addition, the robot control part notifies the robot procurement apparatus 30 or the robot dock management device 20 of a state on its own (the concerned robot 10), information acquired by the sensor 16, information on services currently being provided, as needed.

Figure 3:
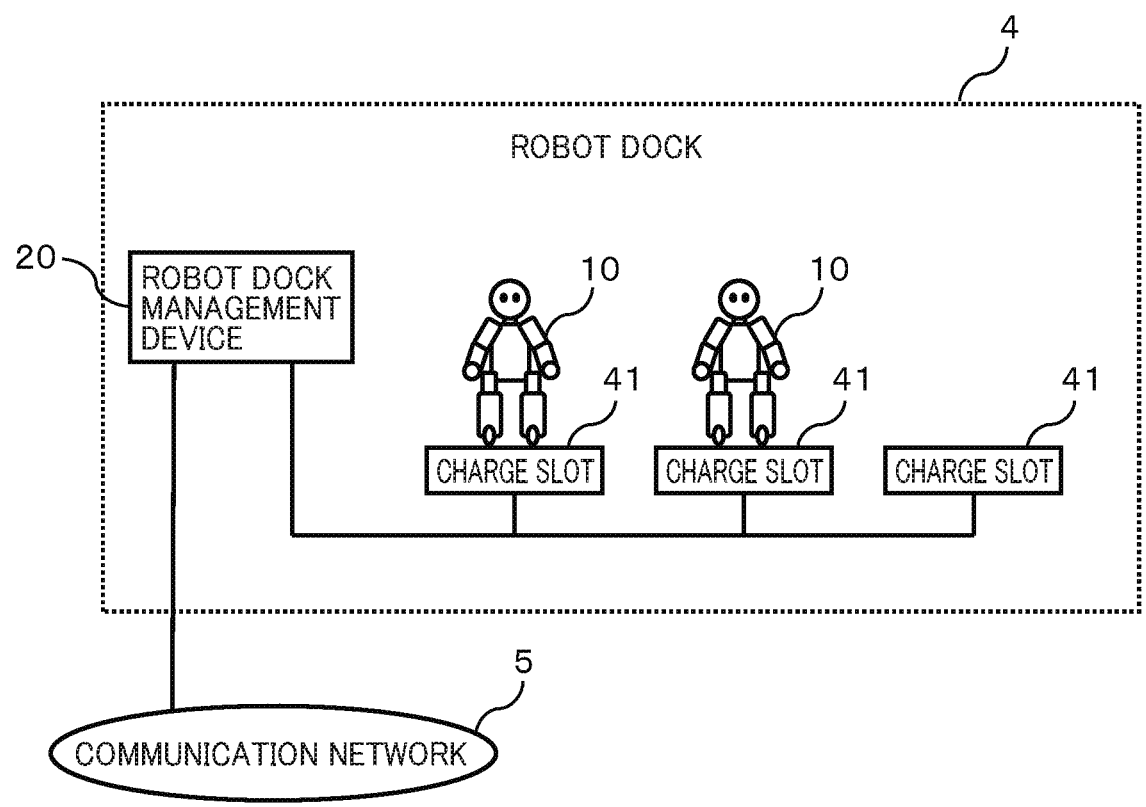

FIG. 3 illustrates a main configuration that the robot dock 4 is equipped with. As illustrated in FIG. 3, the robot dock 4 includes the robot dock management device 20 and one or more charging slots 41. These are coupled via communication facilities of the wired or wireless method (LAN, WAN, Wi-Fi, low power radio, USB, serial communications, or the like) so that they may communicate with each other.

Figure 4:
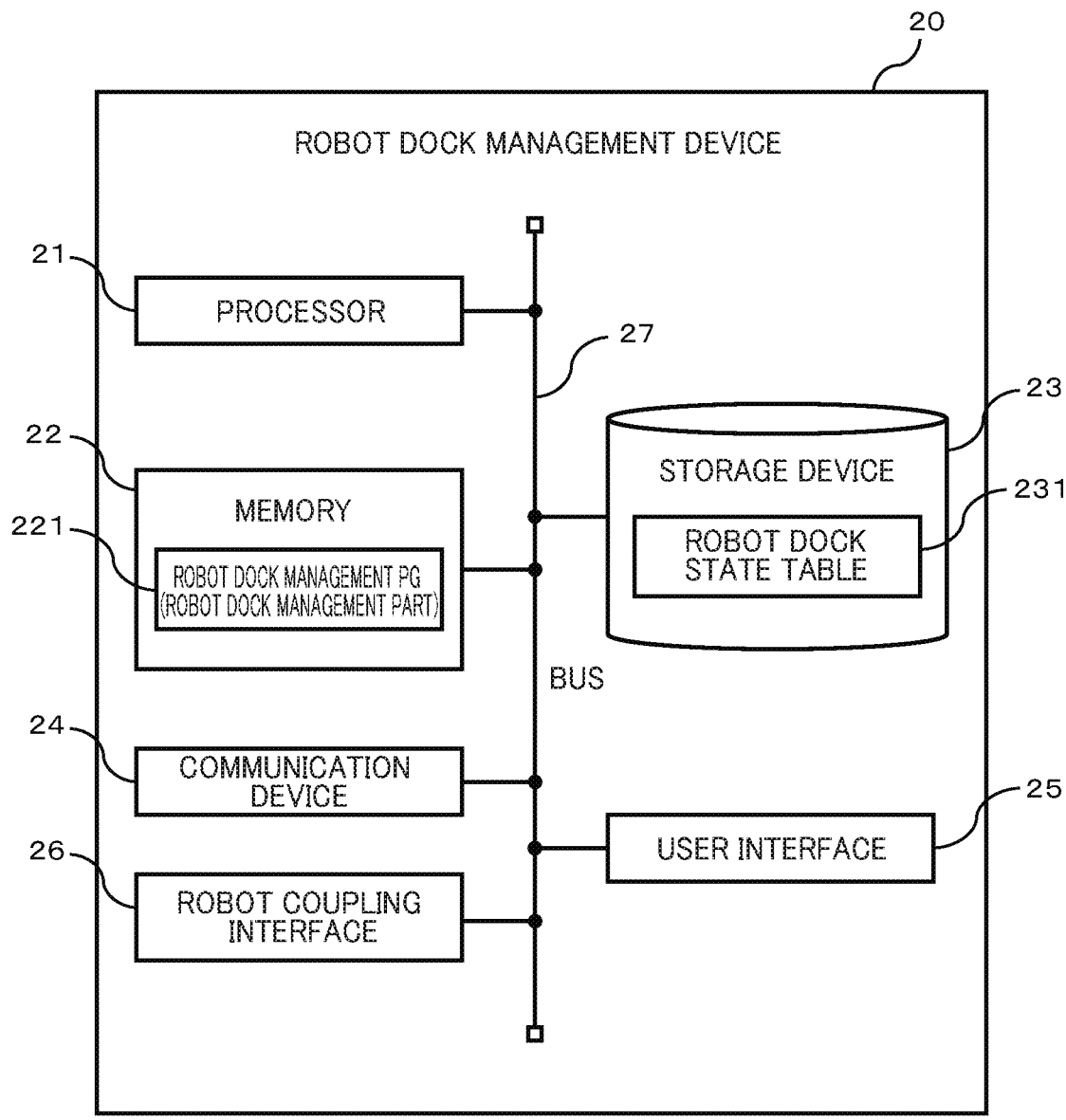
FIG. 4 is a diagram illustrating a main configuration of a robot dock management device.

FIG. 4 illustrates a main configuration of the robot dock management device 20. As illustrated in FIG. 4, the robot dock management device 20 includes a processor 21, a memory 22, a storage device 23, a communication device 24, a user interface 25, and a robot coupling interface 26. These are coupled via a bus 27 to be able to communicate. The processor 21 is configured with the CPU or the MPU. The memory 22 is configured with the ROM, the RAM, the NVRAM, or the like. The storage device 23 is, for example, the SSD, the HDD, the optical/magnetic storage device, or the like. The communication device 14 communicates with the communication network 5 or the charging slots 41 with the wired or wireless method. The processor 21 executing the program stored in the memory 22, various types of functions of the robot dock management device 20 are achieved. The robot dock management device 20 may also be equipped with the functions of the operating system or the DBMS, or the like.

The user interface 25 includes the input device (keyboard, mouse, touch panel, or the like) or the output device (liquid crystal monitor, printer, or the like).

The robot coupling interface 26 communicates with the robot 10 present in the robot dock 4 with the wired or wireless method.

The storage device 23 stores a robot dock state table 231. The robot dock state table 231 may also be stored in the memory 22.

A robot dock management program (hereinafter referred to as a robot dock management PG 221) is stored in the memory 22. The robot dock management PG 221 may also be loaded from the storage device 23 to the memory 22, as needed. In the following, functions achieved by the robot dock management PG 221 being executed are referred to as a robot dock management part.

By communicating with the charging slots 41 or the robots 10, the robot dock management part acquires information on a state of each of the charging slots 41 (whether or not the charging slot 41 is now being occupied by the robot 10, whether or not the robot 10 is being charged, whether or not charging of the robot 10 is complete, or the like). In addition, receiving the operation input instructing procurement of the robot 10 from a person via the user interface 25, the robot dock management part requests the robot procurement apparatus 30 to procure the robot 10. In addition, the robot dock management part updates the robot dock state table 231 based on information acquired from other device such as the charging slots 41 or the robot procurement apparatus 30. The robot dock management part also provides information of the robot dock state table 231 to the robot procurement apparatus 30 via the communication network 5.

The charging slot 41 includes a charge control device, a state detection sensor, and a communication device. The charge control device charges the robots 10 with a contact or contactless power supply method. The charging slot 41 acquires information on a state of its own (the concerned charging slot 41) (whether or not it is now being occupied by the robot 10, whether or not it is now charging the robot 10, or the like). The communication device transmits the above information to the robot dock management device 20.

Figure 5:
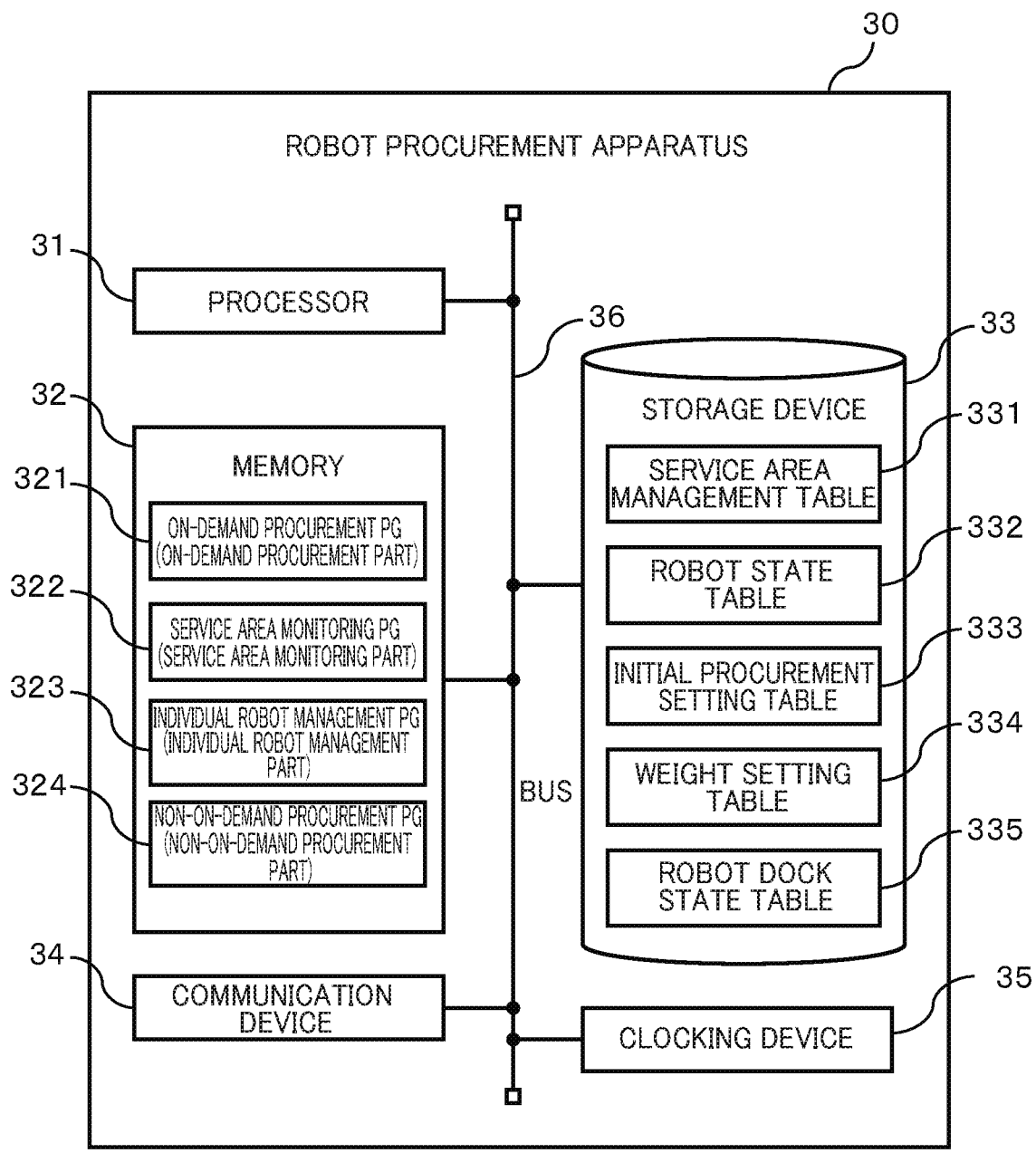
FIG. 5 is a diagram illustrating a main configuration of a robot procurement apparatus.

FIG. 5 illustrates a main configuration of the robot procurement apparatus 30. As illustrated in FIG. 5, the robot procurement apparatus 30 includes a processor 31, a memory 32, a storage device (storage part) 33, a communication device 34, and a clocking device 35. These are coupled to be able to communicate via a bus 36.

The processor 31 is configured with the CPU or the MPU, for example. The memory 32 is configured with the ROM, the RAM, the NVRAM, or the like. The storage device 33 is, for example, the SSD, the HHD, the optical/magnetic storage device, or the like. Note that a distinction between the memory 32 and the storage device 33 is not necessarily strict, and that all or some of both may be achieved by common hardware. The processor 31 executing the program stored in the memory 32, various types of functions of the robot procurement apparatus 30 are achieved. The robot procurement apparatus 30 may further be equipped with the functions of the operating system or the DBMS, or the like.

The communication device 34 is a device that communicates with other devices via the communication network 5, and is configured with the NIC or a wireless communication module, for example. Furthermore, the robot procurement apparatus 30 may be entirely or partly configured by the virtual resource (such as the cloud server in the cloud system).

The clocking device 35 generates information on a date and time such as current time, or the like. The clocking device 35 is configured with a real-time clock (RTC), for example.

The memory 32 stores an on-demand procurement program (hereinafter referred to as an on-demand procurement PG 321), a service area monitoring program (hereinafter referred to as a service area monitoring PG 322), an individual robot management program (hereinafter referred to as an individual robot management PG 323), and a non-on-demand procurement program (hereinafter referred to as a non-on-demand procurement PG 324). They may also be a program that is loaded from the storage device 33 to the memory 32, as needed. In the following, functions achieved by execution of the on-demand procurement PG 321, the service area monitoring PG 322, the individual robot management PG 323, and the non-on-demand procurement PG 324 are referred to as an on-demand procurement part, a service area monitoring part, an individual robot management part, and a non-on-demand procurement part, respectively.

The storage device 33 stores a service area management table 331, a robot state table 332, an initial procurement setting table 333, a weight setting table 334, and a robot dock state table 335. They may also be a table that is stored in the storage device 33 and loaded to the memory 32, as needed.

The on-demand procurement part performs the on-demand procurement process described above. The individual robot management part manages information related to the robot 10 (content of the robot state table 332 or remaining battery level, or the like) or controls the robot 10. The non-on-demand procurement process performs the non-on-demand procurement process described above.

The service area monitoring part updates the service area management table 331 to a latest state in real time by a process to be described below. The service area monitoring part also updates the robot state table 332 in real time based on information acquired from the robots 10 via the communication network 5. The service area monitoring part also updates the robot dock state table 335 in real time based on information (content of the robot dock state table 231 or the like) acquired from the robot dock management devices 20 via the communication network 5. With this, the content of the robot dock state table 335 is synchronized with that of the robot dock state table 231. In addition, the service area monitoring part determines the deficient or surplus number of robots in each of the service areas 2 based on the size of robot load in the service area 2. Furthermore, details of these functions are described below.

Then, various types of tables managed in the robot management system 1 are described.

FIG. 6 is an example of the service area management table 331 stored by the robot procurement apparatus 30. In the service area management table 331, real-time information related to the service areas 2 is managed.

As illustrated in FIG. 6, the service area management table 331 includes more than one record having the following items: an area ID 611, an adjacent area ID 612, priority 613, the number of robots 614, the number of robots in service 615, the number of robots in a robot dock 616, the number of empty slots 617, the number of robots in patrol 618, the number of reserved robots 619, average battery consumption 620, total procurement time 621, a load ratio 622, a target load ratio 623, and the deficient or surplus number of robots 624. One record in the service area management table 331 corresponds to the one service area 2.

To the area ID 611 is set an identifier that uniquely identifies the service areas 2 (hereinafter referred to as an area ID).

To the adjacent area ID 612 is set an area ID of the service area 2 adjacent to the service area 2 (hereinafter referred to the concerned service area 2) having the area ID that is set to the area ID 611. Furthermore, if there are more than one service area 2 adjacent to the concerned service area, more than one area ID is set to the adjacent area ID 612.

To the priority 613 is set priority (priority between the service areas 2) to be set to the service areas 2. The priority is used to determine the service area 2 for which the robot 10 is preferentially procured, if there are more than one service area 2 that needs procurement of the robots 10. The priority is set by an administrator of the robot management system 1, for example. Note that in this embodiment, the priority ranges from 0.1 to 1.0 and the larger the value is, the higher the priority is (takes precedence).

To the number of robots 614 is set the number of robots that are currently present in the concerned service area 2 (hereinafter referred to as the number of current robots). The number of current robots is acquired from the robot state table 332. Note that the robot 10 determined to be dispatched to another service area 2 (hereinafter referred to as a reserved robot 10) is excluded from the number of current robots, even if it is present in the concerned service area 2.

To the number of robots in service 615 is set the number of the robots that are currently providing services (hereinafter referred to as the number of robots in service), of the robots 10 present in the concerned service area 2. The number of robots in service may be acquired as the number of robots 10 for which "In service" is set in a current task 713 of the robot state table 332.

To the number of robots in the robot dock 616 is set the number of the robots 10 that are currently present in the robot docks 4 in the concerned service area 2 (hereinafter referred to as the number of robots in robot docks). This value is acquired from the robot dock state table 231.

To the number of empty slots 617 is set the number of the charging slots 41 that are not occupied by the robots 10 (hereinafter referred to as the number of empty slots) of the charging slots 41 present in the robot docks 4 in the concerned service area 2. The number of empty slots is acquired from the robot dock state table 231.

To the number of robots in patrol 618 is set the number of robots 10 for which "In patrol" is set in the current task 713 in the robot state table 332 (hereinafter referred to as the number of robots in patrol) of the robots 10 present in the concerned service area 2.

To the number of reserved robots 619 is set the number of reserved robots 10 present in the concerned service area 2 (hereinafter referred to as the number of reserved robots). The number of reserved robots is acquired from the states of a current area 715 and a dispatch destination area 716 in the robot state table 332, to be described below.

To the average battery consumption 620 is set an average of battery consumptions 712 of the robots 10 present in the concerned service area 2 (hereinafter referred to as average battery consumption). The average battery consumption is acquired by averaging the battery consumptions 712 in the robot state table 332. The average battery consumption is used to calculate degree of urgency (degree of necessity of procurement of the robots 10 in the service areas 2) to be described below.

To the total procurement time 621 is set a total value of time (hereinafter referred to as total procurement time) required, when the concerned service area 2 is a dispatch destination of the on-demand procurement process, by the procurement target robot 10 to arrive at a designated position after the robot procurement apparatus 30 receives a procurement instruction. The robot procurement apparatus 30 calculates the procurement time based on a distance from the current position of the procurement target robot 10 to the dispatch destination, and average traveling speed of the robot. Instead, for example, the robot procurement apparatus 30 may measure the traveling time of the robot 10 in dispatch in the part, manage the history of the traveling time, and calculate the procurement time based on the history (by averaging, for example).

To the load ratio 622 is set a value indicating degree of current load of the robots 10 present in the concerned service area 2 (hereinafter referred to as a load ratio). Note that in the service area 2 with a high load ratio, the robots 10 have less chances for charging, and a larger number of robots 10 go to the robot dock 4 due to a shortage of the battery power. For example, the service area monitoring part determines the load ratio from the following expression:

Load ratio=Number of robots in service 615/Number of robots 614   (Expression 1)

To the target load ratio 623 is set a value that is set as a target value of the load ratio for the concerned service area 2 (hereinafter referred to as a target load ratio). The target load ratio is set by the administrator, for example. The target load ratio 623 is used when the service area monitoring part determines the deficient or surplus number of robots, to be described below.

To the deficient or surplus number of robots 624 is set an integer value indicating surplus or deficiency of the robots 10 (hereinafter referred to as the deficient or surplus number of robots) currently in the concerned service area 2. A specific method of calculating the deficient or surplus number of robots is described below. Furthermore, if the load ratio 622 is considerably higher than the target load ratio 623, the situation means that the concerned service area 2 is deficient in the robots 10. In this case, the deficient or surplus number of robots takes a negative integer value. On the other hand, if the load ratio 622 is lower than the target load ratio 623, the situation means that surplus robots 10 are present. In this case, the deficient or surplus number of robots takes a positive integer value.

FIG. 7 is an example of the robot state table 322 stored by the robot procurement apparatus 30. The robot state table 332 manages information related to the robots 10 that are managed by the robot management system 1. The robot procurement apparatus 30 acquires the content of the robot state table 332 by communicating with the robots 10 or the robot dock management device 20.

As illustrated in FIG. 7, the robot state table 332 includes more than one record having the following items: a robot ID 711, battery consumption 712, a current task 713, a current position 714, a current area 715, and a dispatch destination area 716. One record of the robot state tale 332 corresponds to one robot 10.

To the robot ID 711 is set an identifier that uniquely identifies each of the robots 10 (hereinafter referred to as a robot ID).

To the battery consumption 712 is set information indicating power consumption (hereinafter referred to as battery consumption) consumed by the robot 10 of the concerned record (hereinafter referred to the concerned robot 10) from the last time when charging is complete till now. In this embodiment, a ratio of consumption from the time of full charging to a total capacity of the battery 19 is set.

To the current task 713 is set information (such as "Charging", "In patrol", "In service", "Moving to a dispatch destination", or the like) indicating what the concerned robot is now doing (hereinafter referred to as a current task). The individual robot management part inquires the robot control part of each robot 10 about the current task to update the content of the current task 713.

To the current position 714 is set information indicating a current position of the concerned robot 10. The above information is, for example, positional coordinates indicating the current position of the concerned robot 10 that is represented by a coordinate system set commonly to the service areas 2. If a positional relation of the service areas 2 is already known, the above information may be the positional coordinates indicating the current position of the concerned robot 10 that is represented by a local coordinate system set for each of the service areas 2. The above information is also an identifier of the charging slot 41 (hereinafter referred to as a charging slot ID) to which the concerned robot 10 is currently coupled. Note that an aspect of the above information is not limited in particular, as far as it may specify the current position of the concerned robot 10. The current position of the robot 10 is acquired by the robot control part of the robot 10, and the individual robot management part receives this via the communication network 5. A method of acquiring the current position of the robot 10 is not limited, in particular. For example, the current position of the robot 10 may be acquired utilizing various publicly known techniques such as those utilizing GPS or Wi-Fi, those utilizing a phase difference of radio waves transmitted from multiple radio stations, those utilizing a depth camera, or the like. The individual robot management part acquires the current position from the robot control part, for example, to update the current position 714.

To the dispatch destination area 716 is set an area ID of the dispatch destination service area 2 of the concerned robot 10 if the concerned robot 10 is a procurement target (reserved). Note that if a value is set to the dispatch destination area 716, it means that the concerned robot 10 is already reserved, and that if "-" is set, it means that the concerned robot 10 is currently not the procurement target.

FIG. 8 is an example of the initial procurement setting table 333 stored by the robot procurement apparatus 30. The initial procurement setting table 333 manages the number of robots that should be present in each of the service areas 2 (hereinafter referred to a target number of robots) when the service area monitoring part, to be described below, starts a service area monitoring process S2400 (initial state).

As illustrated in FIG. 8, the initial procurement setting table 333 includes one or more records having items of an area ID 811 and a target number of robots 812. One record of the initial procurement setting table 333 corresponds to the one service area 2.

To the area ID 811 is set an area ID of the service area 2 of the concerned record (hereinafter referred to as the concerned service area 2). To the target number of robots 812 is set the target number of robots of the concerned service area 2. To a value of the target number of robots 812 is set an estimated value that is determined from an average of usage rate of the robot 10 in the concerned service area 2 for a predetermined past period of time. As described below, in the service area monitoring process S2400 to be described below, the service area monitoring part performs the procurement process such that the number of robots 10 present in each of the service areas 2 at the activation of the robot management system 1 is equal to the set value of the target number of robots 812, and causes the robots 10 to be appropriately located in the service areas 2. This enables provision of high-quality service from an initial stage of the starting.

FIG. 9 is an example of the weight setting table 334 stored by the robot procurement apparatus 30. The weight setting table 334 manages weight coefficients Wa to Wd (symbol 911 to symbol 914) which are set for respective parameters (average battery consumption, load ratio, priority, normalized total procurement time) in the following expression that is used when the non-on-demand procurement part determines the degree of necessity (hereinafter referred to as the degree of urgency) of procurement of the robots 10 in the service areas 2 based on the following expression. Values of the weight coefficients Wa to Wd are set by the administrator of the robot management system 1. The administrator may flexibly set degrees of importance of the parameters by setting the weight coefficients Wa to Wd.

Degree of urgency=$Wa \times$average battery consumption+$Wb \times$load ratio+$Wc \times$priority+$Wd \times$normalized total procurement time    (Expression 2)

If, for example, the average battery consumption, the load ratio, the priority, and the normalized total procurement time are 0.3, 0.4, 0.2, and 0.1, respectively, for the service area 2 having the area ID of "1", 0.2, 0.3, 0.4, and 0.5 for the service area 2 having the area ID of "2", and the weight coefficients Wa to Wd are 0.4, 0.2, 0.2, and 0.2, respectively, the degree of urgency of each of the service areas 2 is determined as follows:

Degree of urgency of the service area 2 having the area ID of "1" =

$$0.4 \times 0.3 + 0.2 \times 0.4 + 0.2 \times 0.2 + 0.2 \times 0.1 = 0.26$$

Degree of urgency of the service area 2 having the area ID of "2" =

$$0.4 \times 0.2 + 0.2 \times 0.3 + 0.2 \times 0.4 + 0.2 \times 0.5 = 0.32$$

In this example, since the service area 2 having the area ID of "2" has the higher degree of urgency than the service area 2 having the area ID of "1", the non-on-demand procurement part preferentially procures the robot 10 for the service area 2 having the area ID of "2".

FIG. 10 is one example of the robot dock state table 231 stored by the robot dock management device 20. The robot dock state table 231 manages information related to each of the robot docks 4.

As illustrated in the FIG. 10, the robot dock state table 231 includes more than one record having the following items: a robot dock ID 1010, a charging slot ID 1012, a charging slot state 1013, a charge-slot-occupying robot ID 1014, and an installation area 1015. One record of the robot dock state table 231 corresponds to one robot dock 4.

To the robot dock ID 1011 is set an identifier that uniquely identifies the robot dock 4 (hereinafter referred to as a robot dock ID).

To the charging slot ID 1012 is set an identifier that uniquely identifies the charging slot 41 (hereinafter referred to as a charging slot ID).

To the charging slot state 1013 is set information indicating a state of the charging slot 41 (in this embodiment, any of "Empty", "Charging", or "Charged (Stand-by)" is set. In the following, they are referred to as a charging slot state). Note that the robot 10 whose charging slot state 1013 is set to "Charged (Stand-by)" is a candidate of the procurement target robot 10.

To the charge-slot-occupying robot ID 1014 is set a robot ID of the robot 10 that is now occupying the charging slot.

Furthermore, the robot dock management part acquires information on the charging slot state 1013 or the charge-slot-occupying robot ID 1014, or the like, via the robot coupling interface 26 of the robot dock management device 20.

To the installation area 1015 is set an area ID of the service area 2 where the concerned robot dock 4 is present or installed in.

Figure 11A:
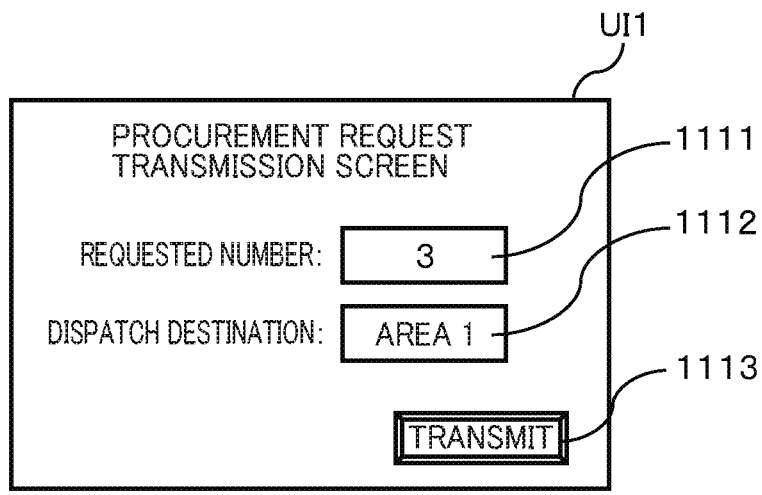
FIG. 11A is an example of a procurement request transmission screen to be displayed to a user by a mobile terminal or the robot dock management device.
Figure 11B:
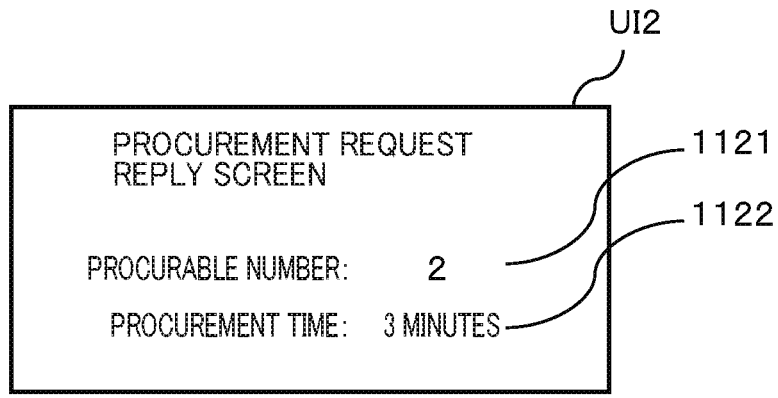
FIG. 11B is an example of a procurement request reply screen.
Figure 11C:
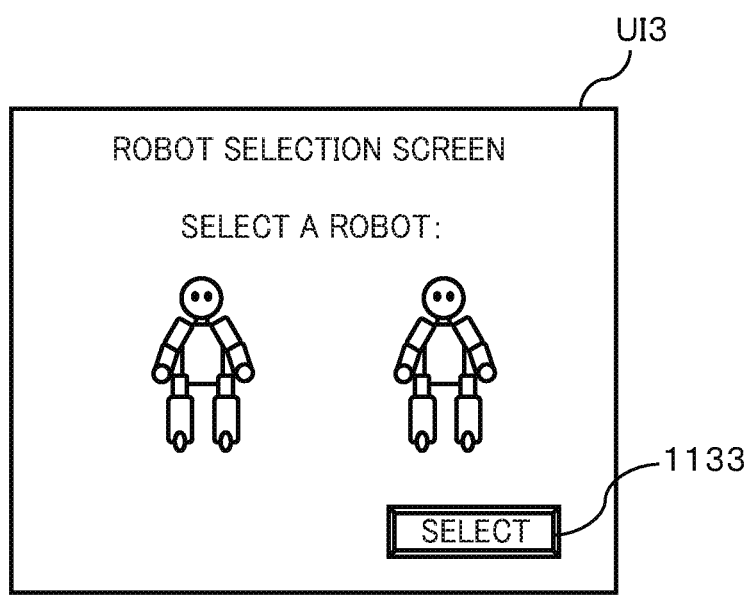
FIG. 11C is an example of a robot selection screen.

FIGS. 11A-C are an example of a screen to be presented to a user by the user interface 25 of the mobile terminal 7 or the robot dock management device 20 in order for the user to procure the robot 10.

In order to procure the robot 10, the user first enters the number of the robots 10 desired to be procured by the user in an entry column 1111 for a requested number and an area ID of the dispatch destination service area 2 in an entry column 1112 for the dispatch destination on the screen illustrated in FIG. 11A (hereinafter referred to as a procurement request transmission screen U11), and then operates a transmit button 1113. With this, a message requesting procurement of the robots 10 (procurement request message M1 to be described below) is transmitted to the robot procurement apparatus 30.

FIG. 11B is a screen (hereinafter referred to as a procurement request reply screen U12) presenting to the user information (such as a procurement request reply message M2, to be described above) returned from the robot procurement apparatus 30 in response to the procurement request described above. In the illustrated in FIG. 11B, a procurable number 1121 or procurement time 1122 taken for the robot 10 to arrive at the dispatch destination service area 2, or the like are displayed on the procurement request reply screen U12.

FIG. 11C is an example of a screen (hereinafter referred to as a robot selection screen U13) to be displayed by the user interface 25 of the robot dock 4 when the user selects the robot 10 present in the robot dock 4 as the procurement target. On the robot selection screen U13 is displayed a list of the robots 10 that can be selected as procurement targets among the robots 10 currently present in the robot dock 4

(for example, the robots 10 charging of which is complete and which are not yet selected as procurement targets). When the user selects any of the robots displayed on the robot selection screen U13 and operates a selection button 1133, information identifying the robot 10 selected by the user (for example, the robot ID) is notified to the robot dock management part. Furthermore, the robot dock management part notifies the robot procurement apparatus 30 of the notified information described above, as needed.

Then, communications to be performed among the constituent elements of the robot management system 1 are described with reference to FIG. 12 to FIG. 17. Note that FIG. 12 to FIG. 16 correspond to the on-demand-procurement process described above and that FIG. 17 corresponds to the non-on-demand process described above. The above-mentioned communications are performed in conformity with provisions for the application layer of the OSI reference model. Furthermore, a communication protocol or an encapsulation method to be used when the above content is transmitted or received as data, as well as a data format, or the like are not necessarily limited, and any appropriate communication protocol, encapsulation method, and data format are selected according to an aspect of a platform or the communication network 5 that are achieved by the robot management system 1.

Figure 12:
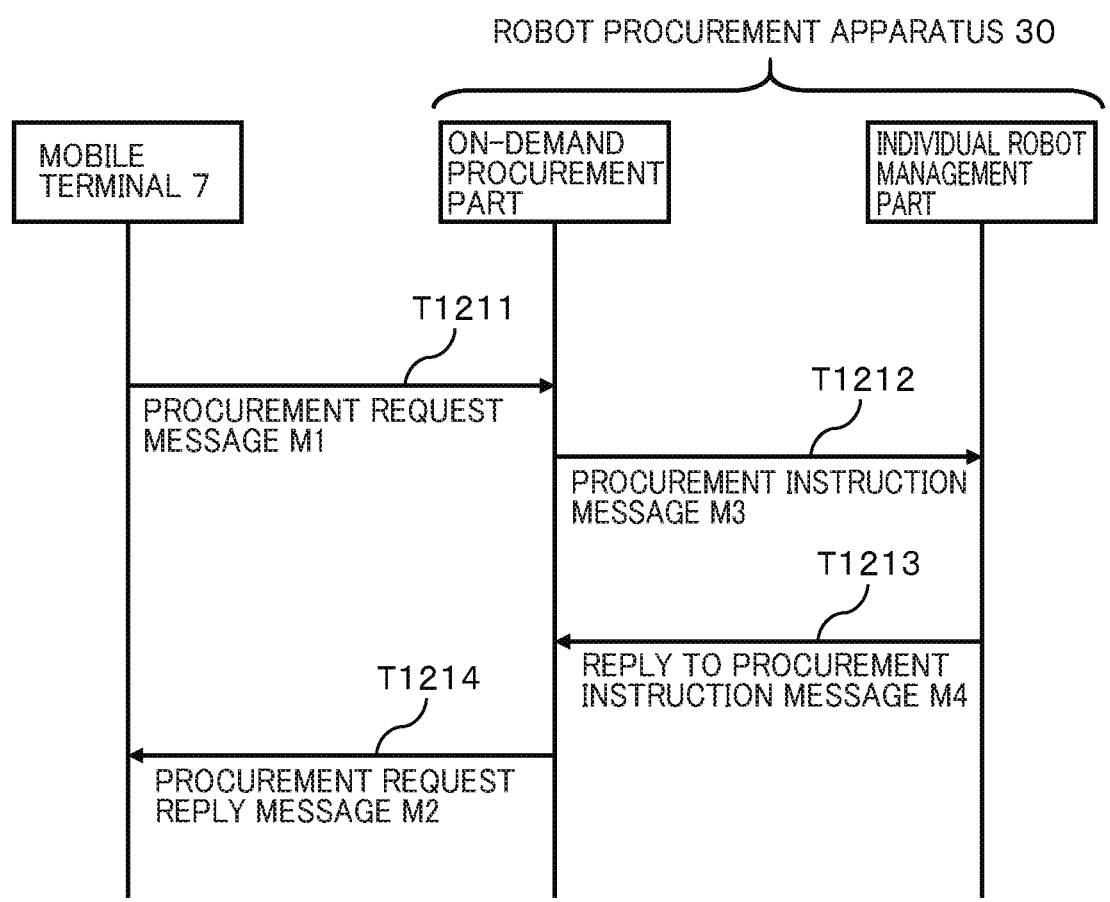
FIG. 12 is a diagram illustrating communications to be performed when the user operates the mobile terminal to request procurement of the robot.

FIG. 12 is a diagram illustrating communications to be performed among the mobile terminal 7, the on-demand procurement part of the robot procurement apparatus 30, and the individual robot management part of the robot procurement apparatus 30 when the user operates the mobile terminal 7 to request procurement of the robot 10.

First, the user operating the procurement request transmission screen U11 displayed on the mobile terminal 7, the procurement request message M1 is transmitted from the mobile terminal 7 to the on-demand procurement part (T1211).

When receiving the procurement request message M1, the on-demand procurement part performs the procurement process to determine the procurement target robot 10, and transmits to the individual robot management part a procurement instruction message M3 including a robot ID of the determined robot 10 (T1212).

When receiving the procurement instruction message M3, the individual robot management part updates the robot state table 332 so that the robot 10 specified by the above robot ID is reserved. In addition, the individual robot management part determines the procurement time of the robot 10 specified by the above robot ID. Then, the individual robot management part transmits to the on-demand procurement part a procurement instruction reply message M4 including the above procurement time (T1213).

When receiving the procurement instruction reply message M4, the on-demand procurement part transmits to the mobile terminal 7 the procurement request reply message M2 (T1214).

When receiving the procurement request reply message M2, the mobile terminal 7 generates the procurement request reply screen U12 stating the procurable number and the procurement time based on the received procurement request reply message M2, and presents the procurement reply screen U12 to the user.

Figure 13:
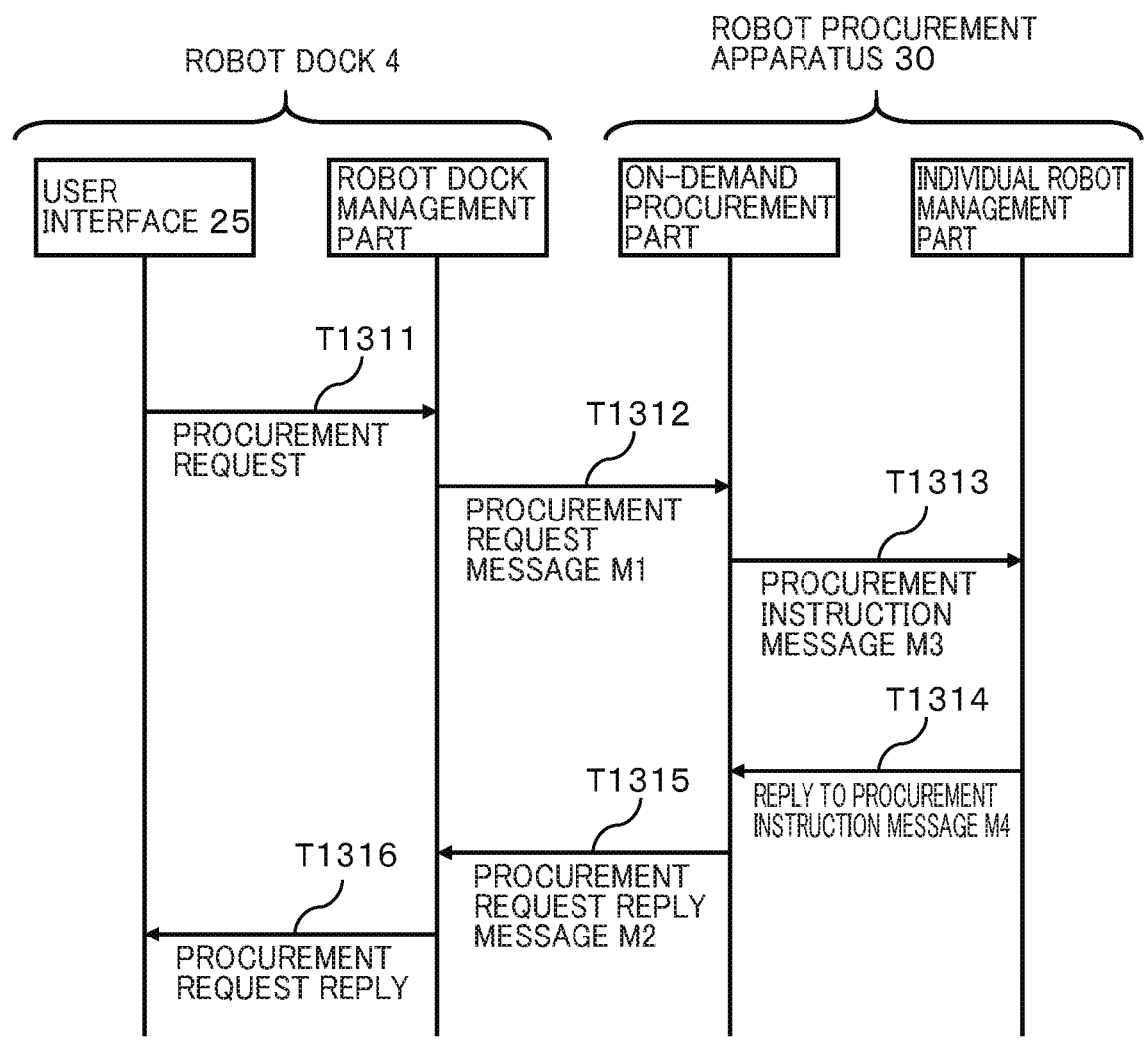
FIG. 13 is a diagram illustrating communications to be performed when operating a user interface of a user robot dock to request the procurement of the robot.

FIG. 13 is a diagram illustrating communications to be performed among the user interface 25, the robot dock management part of the robot dock management device 20, the on-demand procurement part of the robot procurement apparatus 30, and the individual robot management part of the robot procurement apparatus 30, when the user operates the user interface 25 of the robot dock 4 to request procurement of the robot 10.

As illustrated in the FIG. 13, the user operating the procurement request transmission screen U11 presented by the user interface 25, the procurement request (notice (signal)) is transmitted from the user interface 25 to the robot dock management part (T1311).

When receiving the procurement request, the robot dock management part generates and transmits the procurement request message M1 to the on-demand procurement part (T1312).

When receiving the procurement request message M1, the on-demand procurement part performs the procurement process to determine the procurement target robot 10, and transmits to the individual robot management part the procurement instruction message M3 including the robot ID of the determined robot 10 (T1313).

When receiving the procurement instruction message M3, the individual robot management part updates the robot state table 332 so that the robot 10 specified by the above robot ID is reserved. The individual robot management part also determines the procurement time of the robot 10 specified by the above robot ID. Then, the individual robot management part generates the procurement instruction reply message M4 and transmits it to the on-demand procurement part (T1314).

When receiving the procurement instruction reply message M4, the on-demand procurement part transmits to the robot hot dock management part the procurement request reply message M2 (T1315).

When receiving the procurement request reply message M2, the robot dock management part transmits to the user interface 25 a reply (notice (signal)) to the procurement request (T1316).

When receiving the procurement request reply, the user interface 25 generates the procurement request reply screen U12 stating the procurable number and the procurement time based on the received procurement request reply, and presents the procurement request reply screen U12 to the user.

Then, in the method described above also with reference to FIG. 12 and FIG. 13, when the user specifies the requested number and the dispatch destination on the procurement request transmission screen U11, the robot procurement apparatus 30 automatically procures the procurable number of robots 10. However, the user may operate the user interface of the robot dock 4 by himself or herself and select (pick up) the procurement target robot 10.

Figure 14:
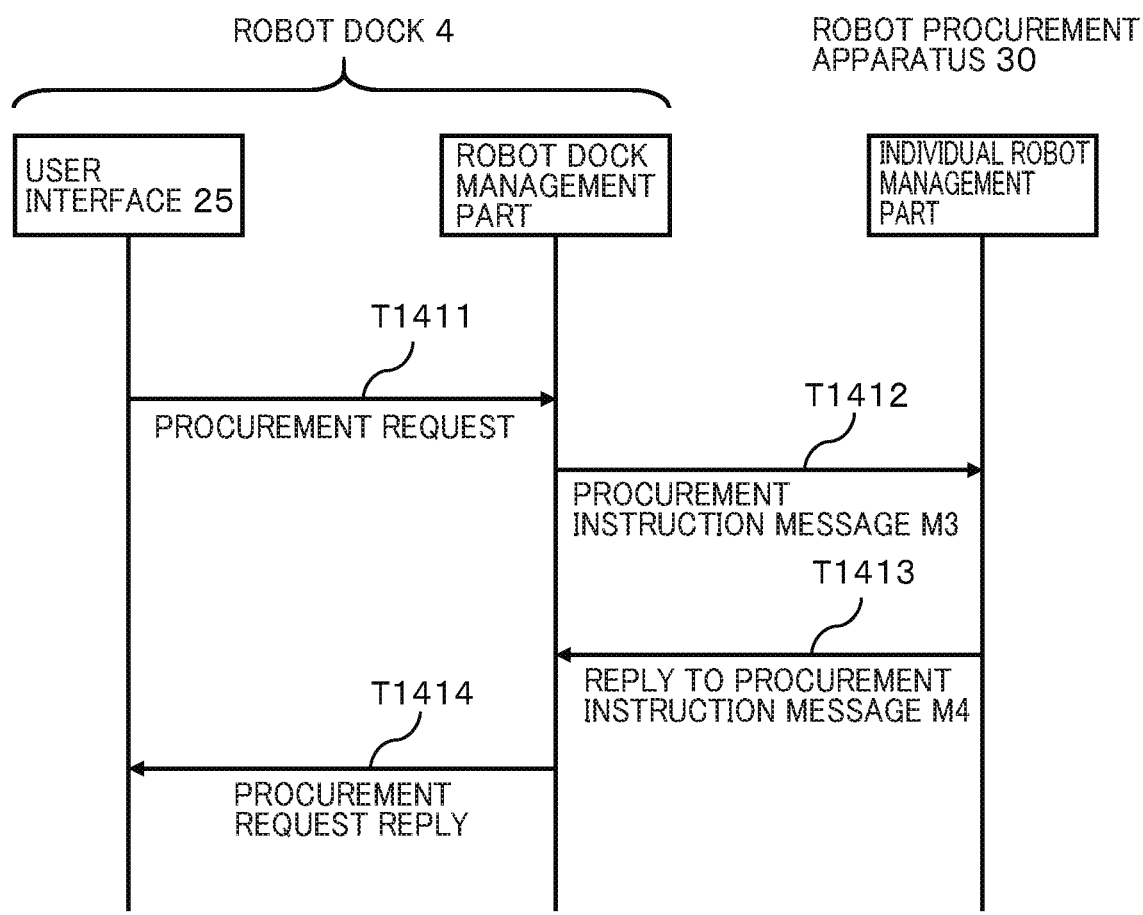
FIG. 14 is a diagram illustrating communications to be performed when the user operates the user interface by himself or herself to select a procurement target robot.

FIG. 14 is a diagram illustrating communications to be performed among the user interface 25, the robot dock management part, and the individual robot management part of the robot procurement apparatus 30, when the user operates the user interface 25 by himself or herself to select the procurement target robot 10.

First, the user operating the robot selection screen U13, the procurement instruction (notice (signal)) including the robot ID of the robot ID selected by the user is transmitted from the user interface 25 to the robot dock management part (T1411).

When receiving the procurement instruction, the robot dock management part generates the procurement message M3 including the above robot ID and transmits the procurement message M3 the procurement message M3 to the individual robot management part (T1412).

When receiving the procurement instruction message M3, the individual robot management part updates the robot state table 332 so that the robot 10 specified by the above robot ID is reserved. The individual robot management part also determines the procurement time of the robot 10 specified by the above robot ID. Then, the individual robot management part transmits to the on-demand procurement part the procurement instruction reply message M4 (T1413).

When receiving the procurement instruction reply message M4, the robot dock management part transmits to the user interface 25 the reply (notice (signal)) to the procurement instruction (T1414).

When receiving the procurement instruction reply, the user interface 25 generates the procurement request reply screen U12 stating the procurable number and the procurement time based on the received procurement instruction reply, and presents the procurement request reply screen U12 to the user. Furthermore, a method of calculating the procurable number is described below.

Figure 15:
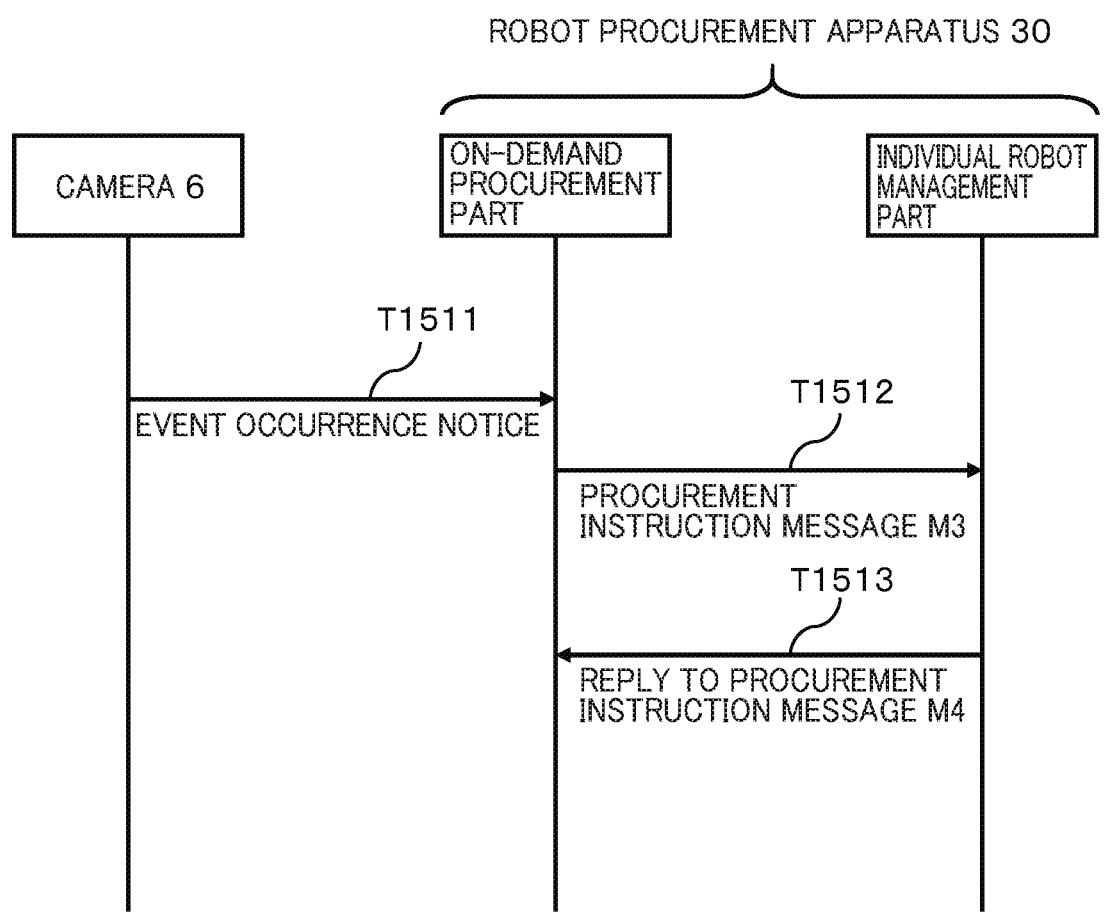
FIG. 15 is a diagram illustrating communications to be performed when a procurement process is performed in response to an event occurrence notice that is sent from a camera.

FIG. 15 is a diagram illustrating communications to be performed among the camera 6, the on-demand procurement part of the robot procurement apparatus 30, and the individual robot management part of the robot procurement apparatus 30, when the procurement process is performed according to an event occurrence notice sent from the camera 6.

When sensing that, for example, a person who is present in the service area 2 does a predetermined action (for example, a gesture such as raising his or her hand, walking around, stopping for a long time, or the like), the camera 6 transmits the event occurrence notice to the on-demand procurement part of the robot procurement apparatus 30 (T1511). Note that the event occurrence notice may include information indicating a position of the user who did the predetermined action.

When receiving the event occurrence notice, the on-demand procurement part performs the procurement process to determine the procurement target robot 10, and transmits to the individual management part the procurement instruction message M3 including the robot ID of the determined robot 10 (T1512). Furthermore, the procurement target robot 10 may be determined by utilizing information indicating the position of the person who did the predetermined action (such as selecting as the procurement target the surplus robot 10 that is present closest to the person who did the predetermined action).

When receiving the procurement instruction message M3, the individual robot management part updates the robot state table 332 so that the robot 10 specified by the above robot ID is reserved. The individual robot management part also determines the procurement time of the robot 10 specified by the above robot ID. Then, the individual robot management part generates the procurement instruction reply message M4 and transmits to the on-demand procurement part the procurement instruction reply message M4 (T1513).

Figure 16:
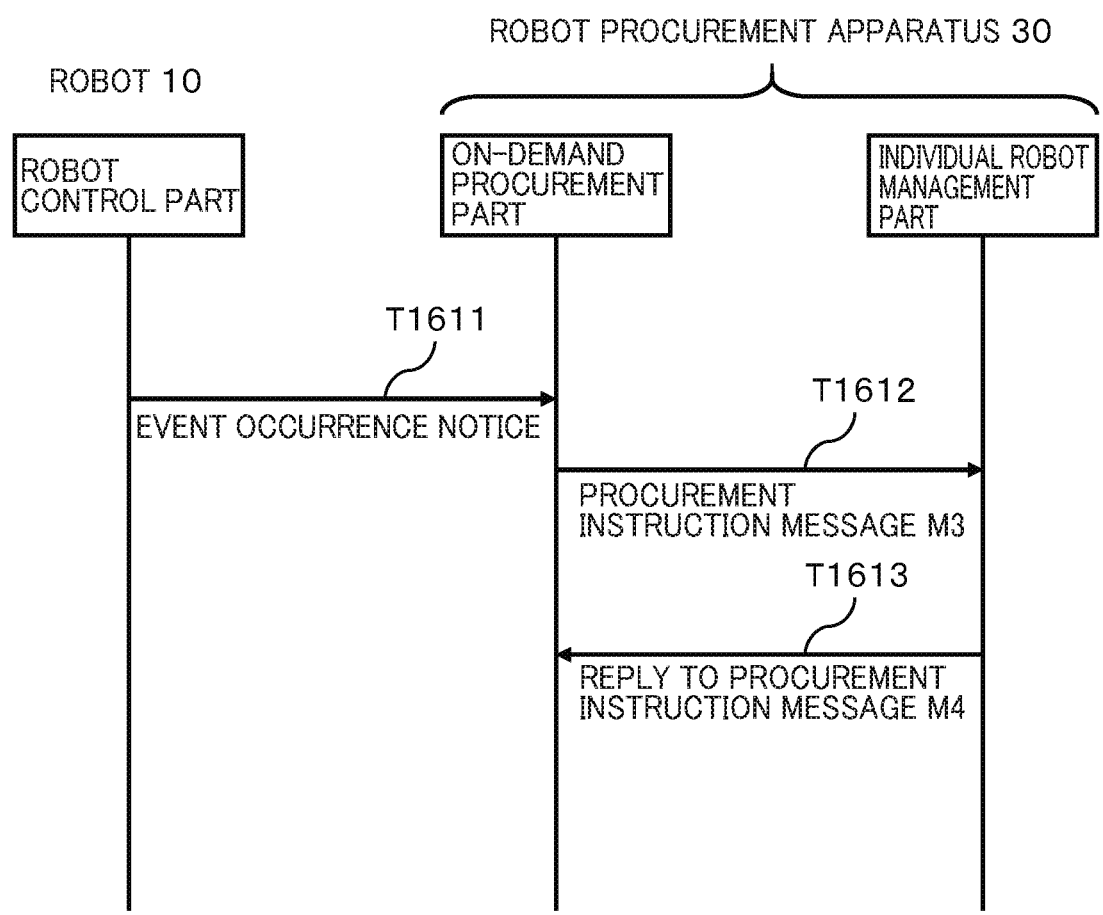

FIG. 16 is a diagram illustrating communications to be performed among the robot control part of the robot 10, the on-demand procurement part of the robot procurement apparatus 30, and the individual robot management part of the robot procurement apparatus 30, when the procurement process is performed based on the information outputted from the sensor 16 that the robot 10 is equipped with, and according to the event occurrence notice issued by the robot 10.

When sensing occurrence of a predetermined event such as the person present in the service area 2 doing the predetermined action (for example, a gesture such as raising his or her hand, walking around, stopping for a long time, or the like) or the service area 2 having overcrowded, based on the information from the sensor 16, the robot 10 generates and transmits the event occurrence notice to the on-demand procurement part (T1611). Note that the event occurrence notice may include information indicating a position of the user who did the predetermined action.

When receiving the event occurrence notice, the on-demand procurement part performs the procurement process to determine the procurement target robot 10, and transmits to the individual robot management part the procurement instruction message M3 including the robot ID of the determined robot 10 (T1612). Furthermore, in the above procurement process, the procurement target robot 10 may be determined by utilizing information indicating the position of the person who did the predetermined action (for example, selecting, as a procurement target, the surplus robot 10 that is present closest to the person who did the predetermined action).

When receiving the procurement instruction message M3, the individual robot management part updates the robot state table 332 so that the robot 10 specified by the above robot ID is reserved. The individual robot management part also determines the procurement time of the robot 1 specified by the above robot ID. Then, the individual robot management part generates the procurement instruction reply message M4 and transmits to the on-demand procurement part the procurement instruction reply message M4 (T1613).

Figure 17:
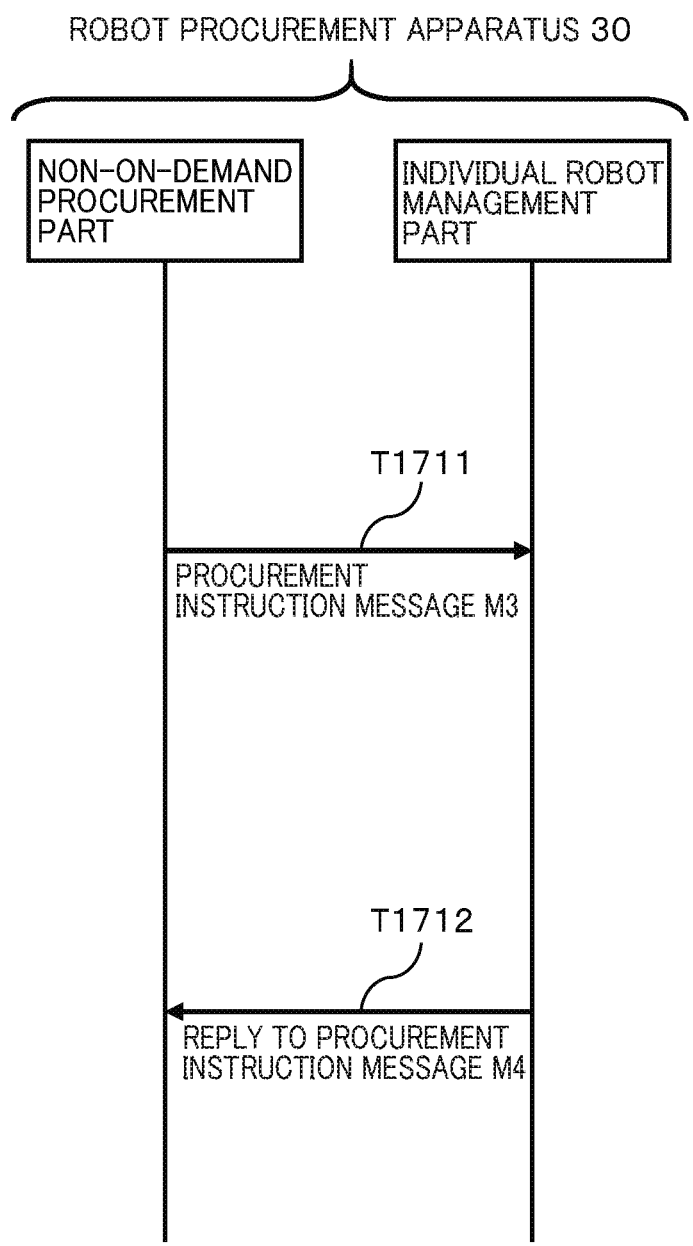
FIG. 17 is a diagram illustrating communications to be performed during a non-on-demand process.

FIG. 17 is a diagram illustrating communications between the non-on-demand procurement part of the robot procurement apparatus 30 and the individual robot management part of the robot procurement apparatus 30 in the non-on-demand processing.

The non-on-demand procurement part actively starts the non-on-demand procurement process with a view to improving the load ratio of each of the service areas 2, for example.

As illustrated in FIG. 17, the non-on-demand procurement part actively performs the non-on-demand procurement process to determine the robot 10 to be procured, and transmits to the individual robot management part the procurement instruction message M3 including the robot ID of the determined robot 10 (T1711).

When receiving the procurement instruction message M3, the individual robot management part updates the robot state table 332 so that the robot 10 specified by the above robot ID is reserved. The individual robot management part also determines the procurement time of the robot 10 specified by the above robot ID. Then, the individual robot management part generates the procurement instruction reply message M4 and transmits to the on-demand procurement part the procurement instruction reply message M4 (T1712).

Figure 18:
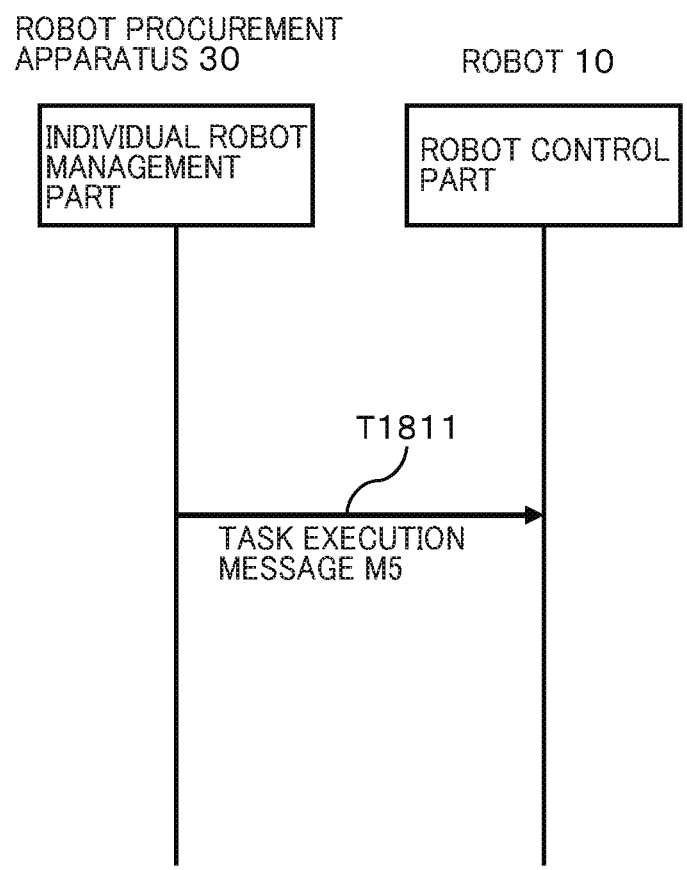
FIG. 18 is a diagram illustrating communications to be performed between an individual robot management part and a robot control part.

FIG. 18 is a diagram illustrating communications to be performed between the individual robot management part of the robot procurement apparatus 30 and the robot control art of the robot 10.

The individual robot management part transmits a task execution message M5 to the robot control part, as needed (T1811).

When receiving the task execution message M5, the robot control part performs a task specified in the received task execution message M5.

FIG. 19A and FIG. 19B are both an example of the procurement request message M1. FIG. 19A is an example of the procurement request message M1 to be transmitted from the mobile terminal 7 to the on-demand procurement part in FIG. 12, while FIG. 19B is an example of the procurement request message M1 to be transmitted from the robot dock management part to the on-demand procurement part in FIG. 13.

As illustrated in FIG. 19B, the procurement request message M1 has items of a request source 1911, a dispatch destination 1912, a procurement request 1913, a dispatch destination position 1914, and a message ID 1915.

To the request source 1911 is set information that identifies a transmission source of the procurement request 1913. In FIG. 19A, a mobile terminal ID which is an identifier of the mobile terminal is set. In FIG. 19B, a robot dock management ID which is an identifier of the robot dock management part is set.

To the dispatch destination 1912 is set an area ID of the dispatch destination service area.

To the procurement request 1913 is set information indicating the number of robots 10 requested to be procured and a task to be performed by the robot 10 at the dispatch destination. In FIG. 19A, "1" is set as the number of robots 10 requested to be procured, and "handover of the task of the robot having the robot ID of "2"" is set as information indicating the task to be performed by the robot 10.

To the dispatch destination position 1914 is set information that identifies a position of the dispatch destination.

To the message ID 1915 is set an identifier that uniquely identifies the procurement request message (hereinafter referred to as a procurement request message ID).

FIG. 20 is an example of the procurement request reply message M2 as described above. As illustrated in FIG. 20, the procurement request reply message M2 has items of a reply destination 2001, a message ID 2002, a procurement request reply 2003, and procurement time 2004.

To the reply destination 2001 is set information that identifies a transmission source of the procurement request (more specifically, a transmission destination of the concerned reply message) which triggers generation of the concerned procurement request reply message M2.

To the message ID 2002 is set information (hereinafter referred to as a procurement request reply message ID) that uniquely identifies a reply message.

To the procurement request reply 2003 is set content of a procurement request reply 1913 of the procurement request message M1. For example, if the request of the procurement request 1913 may not be met, "Impossible" is set to the procurement request reply 2003. In addition, for example, although the number of robots requested by the procurement request 1913 is "2", "Robot ID:00001" is set to the procurement request reply 2003 if the robot 10 that can be procured as a result of the procurement process is only the robot 10 having the robot ID of "00001".

To the procurement time 204 is set time (procurement time) required by the dispatched robot 10 to arrive at the dispatch destination.

FIG. 21 is an example of the procurement instruction message M3 described above. As illustrated in FIG. 21, the procurement instruction message M3 has items of a transmission source 2101, a message ID 2102, a procurement target robot ID 2103, a dispatch destination area 2104, a dispatch destination position 2105, and a task 2106.

To the transmission source 2101 is set information that identifies a transmission source of the concerned procurement instruction message M3.

To the message ID 2102 is set information (hereinafter referred to procurement instruction message ID) that uniquely identifies the procurement instruction message M3.

To the procurement target robot ID 2103 is set a robot ID of the procurement target robot 10.

To the procurement area 2104 is set an area ID of the dispatch destination service area 2.

To the dispatch destination position 2105 is set information that identifies a position of the dispatch destination.

To the task 2106 is set information that identifies the task to be performed by the robot 10 at the dispatch destination. In this embodiment, "Patrol" is set.

Figure 22:
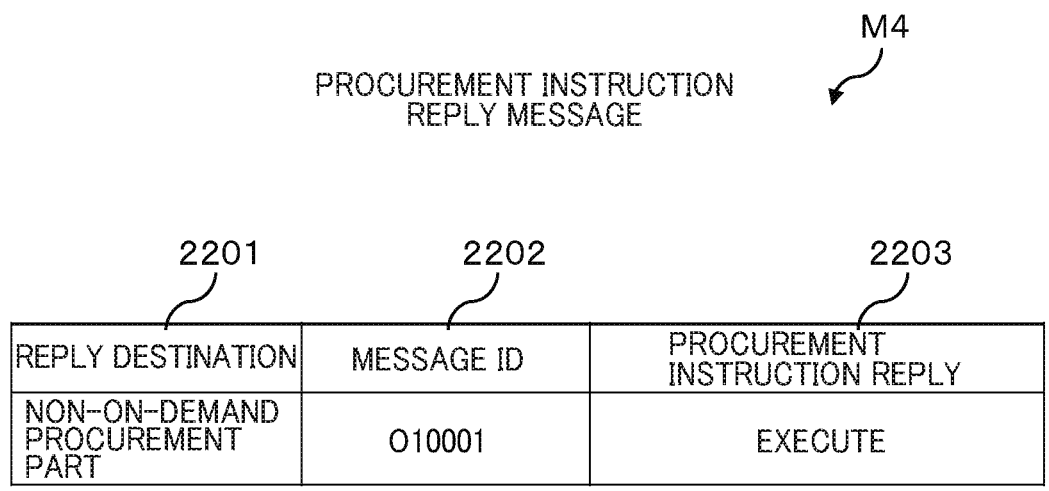
FIG. 22 is the example of a procurement request reply message.

FIG. 22 is an example of the procurement instruction reply message M4 described above. As illustrated in FIG. 22, the procurement instruction reply message M4 has items of a reply destination 2201, a message ID 2202, and a procurement instruction reply 2203.

To the reply destination 2201 is set information that identifies the transmission source (more specifically, a transmission destination of the concerned procurement instruction reply message M4) of the procurement instruction that triggers generation of the concerned procurement instruction reply message M4.

To the message ID 2202 is set information that uniquely identifies the procurement instruction reply message M4 (hereinafter referred to as a procurement instruction reply message ID).

To the procurement instruction reply 2203 is set information indicates whether or not the task set for the task 2106 of the procurement instruction message M3 is performed.

Figure 23:
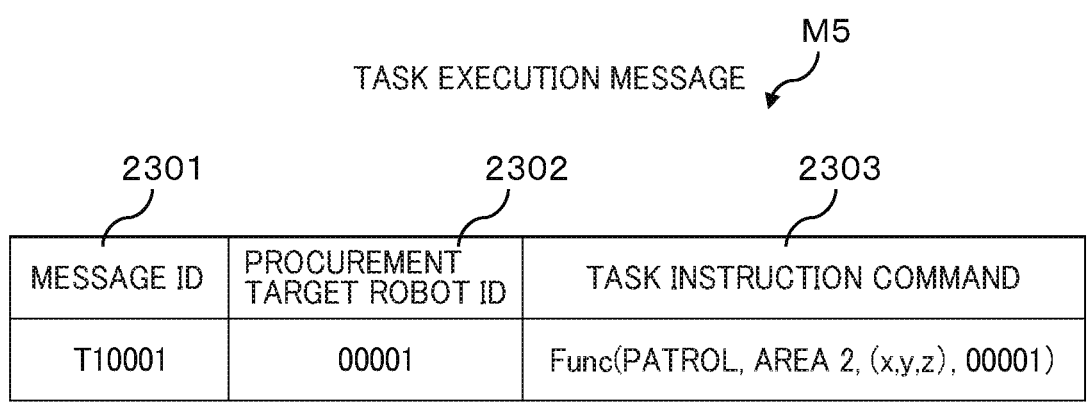
FIG. 23 is an example of a task execution message.

FIG. 23 is an example of the task execution message M5 described above. As illustrated in FIG. 23, the task execution message M5 has items of a message ID 2301, a procurement target robot ID 2302, and a task instruction command 2303.

To the message ID 2301 is set information (hereinafter referred to as a task execution message ID) that uniquely identifies the task execution message M5.

To the procurement target robot ID 2302 is set a robot ID of the procurement target.

To the task instruction command 2303 is set a command to instruct the robot control part to execute a task. In this example, "func(patrol, area 2, (x, y, z), 00001)" is set to the task instruction command 2303. This command is to instruct the robot 10 to conduct a patrol that has, as a starting point, a position (x, y, z) of the service area 2 with the service area ID of "2".

Then, processing to be performed in the robot management system 1 is described.

Figure 24:
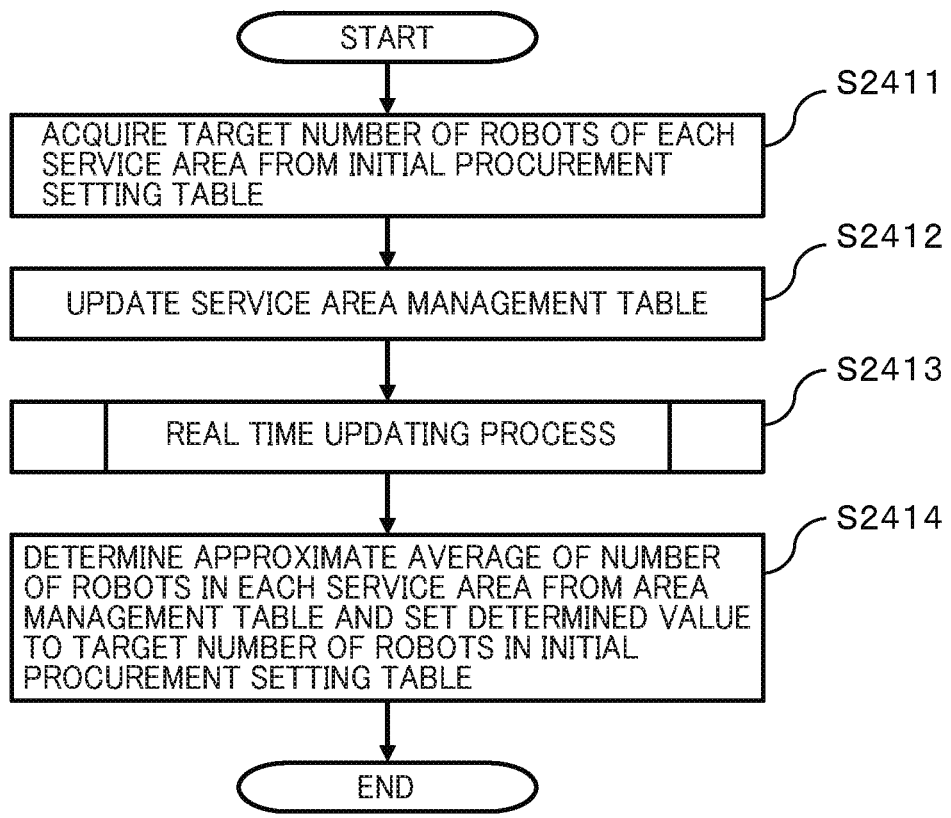
FIG. 24 is a flow chart illustrating a service area monitoring process.

FIG. 24 is a flowchart illustrating a process (hereinafter referred to a service area monitoring process S2400) for the service area monitoring part (area monitoring program 142) of the robot procurement apparatus 30 to update the service area management table 331 and the initial procurement setting table 333. In the following, the service area monitoring process S2400 is described with reference to FIG. 24.

The service area monitoring part first acquires a value of the target number of robots 812 for each service area from the initial procurement setting table 333 (S2412). In the following, for convenience of explanation, the acquired value of the target number of robots 812 for each service area is expressed as $a_i$, and the number of robots of the number of robots 614 in the service area management table 331 is expressed as $b_i$. Note that the subscript i is an area ID.

Then, the service area monitoring part updates content of the service area management table 331 based on the robot state table 332 (S2412).

Furthermore, for each of the service areas 2, the service area monitoring part determines a difference between the target number of robots and the number of robots, $a_i - b_i$, and sets this to the deficient or surplus number of robots 624 in each of the service areas 2. Furthermore, if $a_i - b_i$ is a positive value, it means that the number of robots 10 in that service area 2 is insufficient. If $a_1-b_1$ is a negative value, it means that surplus robots 10 are present in that service area 2.

Then, the service area monitoring part starts a real-time updating process (hereinafter referred to as a real-time updating process S2413) of the service area management table 331.

Figure 25:
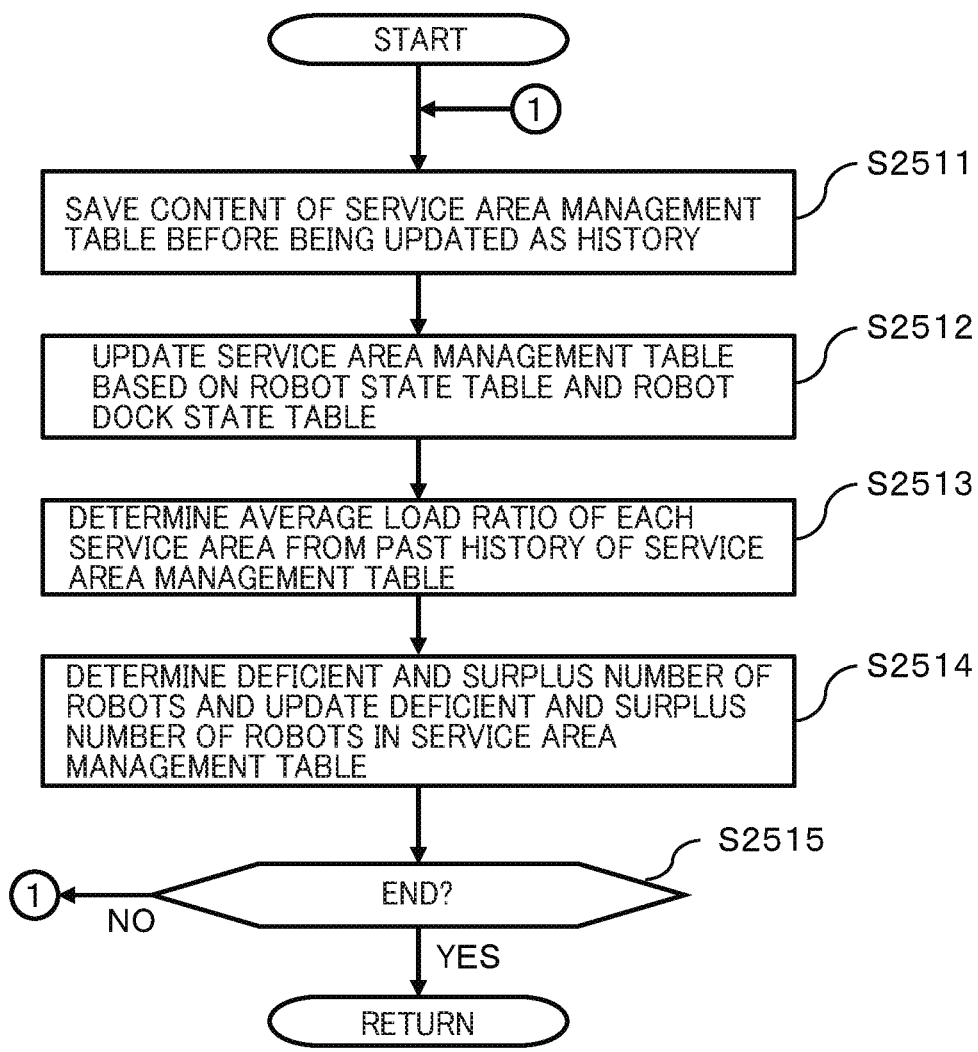
FIG. 25 is a flow chart illustrating a real-time updating process.

FIG. 25 is a flow chart illustrating details of the real-time updating process S2413. As illustrated in FIG. 25, the service area monitoring part first saves content of the current service area management table 331 in the storage device 33 as history information (S2511). Furthermore, in this manner, content of the service area management table 331 at each time section in the past is sequentially saved.

Then, the service area monitoring part updates the service area management table 331 based on the robot state table 332 and the robot dock state table 335 (S2512). Furthermore, for example, in the robot state table 332, if the number of robots 10 now being charged in the service area 2 (hereinafter referred to as the concerned service area) having the area ID "1" is 1 and its battery consumption 712 is 30%, the number of robots 10 now offering services is 1 and its battery consumption 712 is 10%, and the number of patrolling robots is 1 and its battery consumption 712 is 20%, the service area monitoring part sets "3" to the number of robots 614 in the concerned service area 2 of the service area management table 331, and sets "20", which is an average of the battery consumption 712 of the three robots 10 as described above, to the average battery consumption.

Then, from history of the service area management table 331, the service area monitoring part determines an average of the load ratio (hereinafter referred to as an average load ratio) of each of the service areas 2 for a past predetermined period of time (S2513).

Then, the service area monitoring part determines the deficient or surplus number of robots in each of the service areas 2 by substituting into the following expression a value of the target load ratio 623 in the service area 2 of the service area management table 331, a value of the number of robots 614, and the average load ratio determined in S2513, and sets the determined value to the deficient or surplus number of robots 624 of the service area management table 331 (S2514). Note that in implementation, floor( ) is a floor function and that the deficient or surplus number of robots takes an integer value.

Deficient or surplus number of robots=floor((target load ratio−average load ratio)×current number of robots)   (Expression 3)

Then, the service area monitoring part determines whether or not to terminate the real-time updating process S2413 (S2514). If the service area monitoring part determines to terminate (S2515: YES), the process proceeds to S2414 in FIG. 24. If the service area monitoring part determines not to terminate (S2515: NO), the process returns to S2413. Furthermore, when sensing occurrence of an event that terminates the real-time updating process S2413 (such as reception of a termination signal from outside, or the like), the service area monitoring area determines that it terminates the real-time updating process S2413.

Since the service area monitoring part thus sets the deficient or surplus number of robots in each of the multiple service areas 2 based on the size of load of the robot 10 in each of the service areas 2, the service area monitoring part can appropriately set the deficient or surplus number of robots based on the size of load of the robot 10 in each of the service areas 2.

Turning back to FIG. 24, in S2414, the service area monitoring part determines an approximate average of the number of robots 614 in each of the service areas 2 (for example, determines it by using a floor function ceiling( ) function or a ceiling function floor ( ) function) for a period of time from a predetermined point of time to the present, based on the history information in the service area management table 331, and sets the determined value to the target number of robots 812 in the initial procurement setting table. With this, when a next service area monitoring process S2400 starts, the target number of robots that is estimated based on the above history information is applied and the robots 10 can be approximately allocated as the entire robot management system. 1, thus enabling efficient operation of the robots 10.

Figure 26:
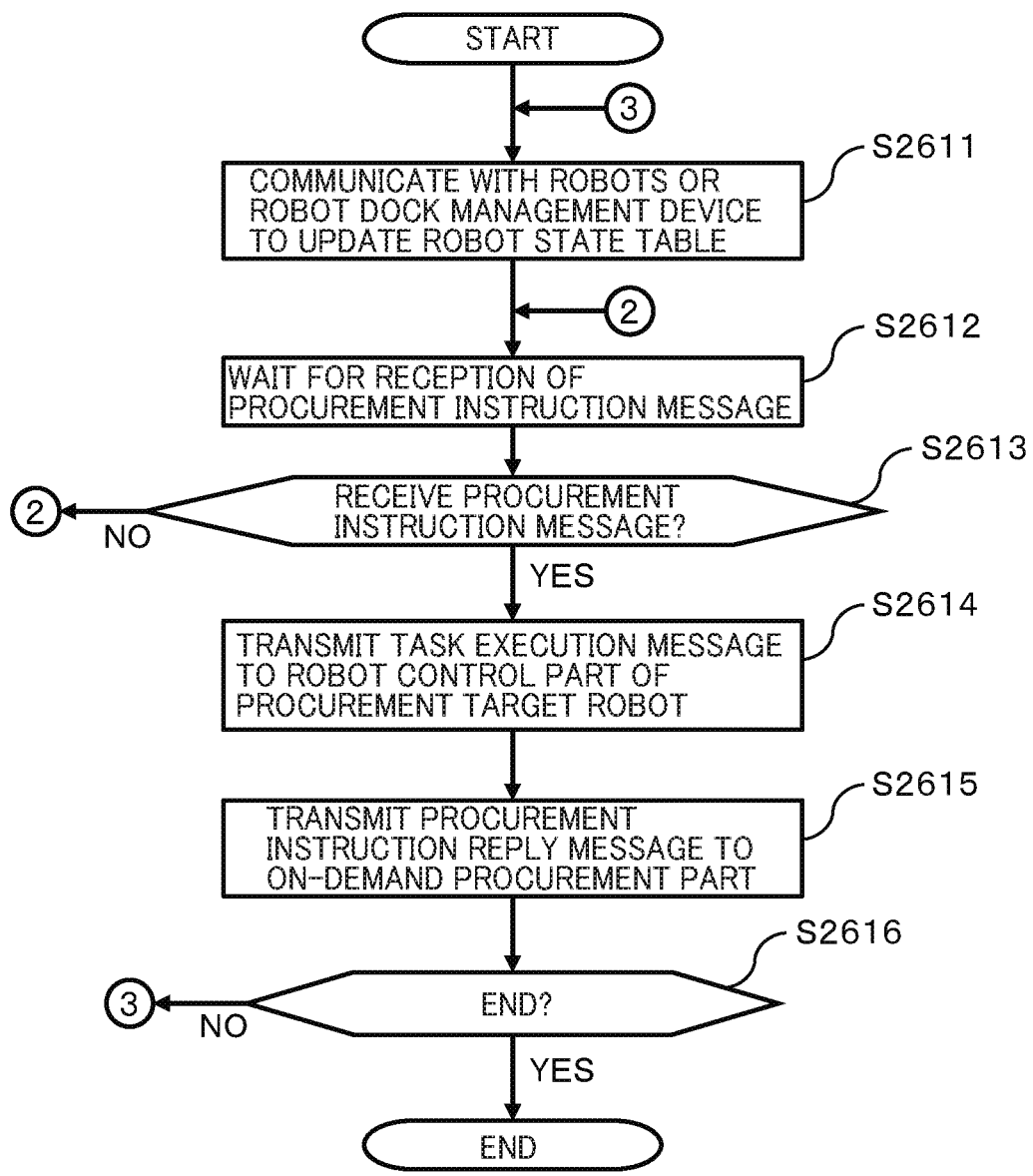
FIG. 26 is a flow chart illustrating an individual robot management process.

FIG. 26 is a flow chart illustrating a process to be performed by the individual robot management part of the robot procurement apparatus 30 (hereinafter referred to as the individual robot management process S2600). The individual robot management process S2600 is described hereinafter with reference to FIG. 26.

The individual robot management part first acquires information from the robots 10 or the robot dock management device 20 through communications therewith, and updates the robot state table 332 with the acquired information (S2611).

Then, the individual robot management part waits for reception of the procurement instruction message M3 (S2612).

When receiving the procurement instruction message M3 (S2613: YES), the individual robot management part transmits the task execution message M5 to the robot control part of the robot 10 that is identified by the procurement target robot ID 2103 in the procurement instruction message M3 (S2614).

Then, the individual robot management part transmits the procurement instruction reply message M4 to the on-demand procurement part (S2615).

Then, the individual robot management part determines whether or not to terminate the individual robot management process S2600 (S2616). If the individual robot management part determines not to terminate (S2616: NO), the process returns to the S2611. If the individual robot management part determines to terminate (S2616: YES), the individual robot management process S2600 ends. Furthermore, when sensing occurrence of an event that terminates the individual robot management process S2600 (such as reception of a termination signal from outside), for example, the individual robot management part determines to terminate the individual robot management process S2600.

Figure 27:
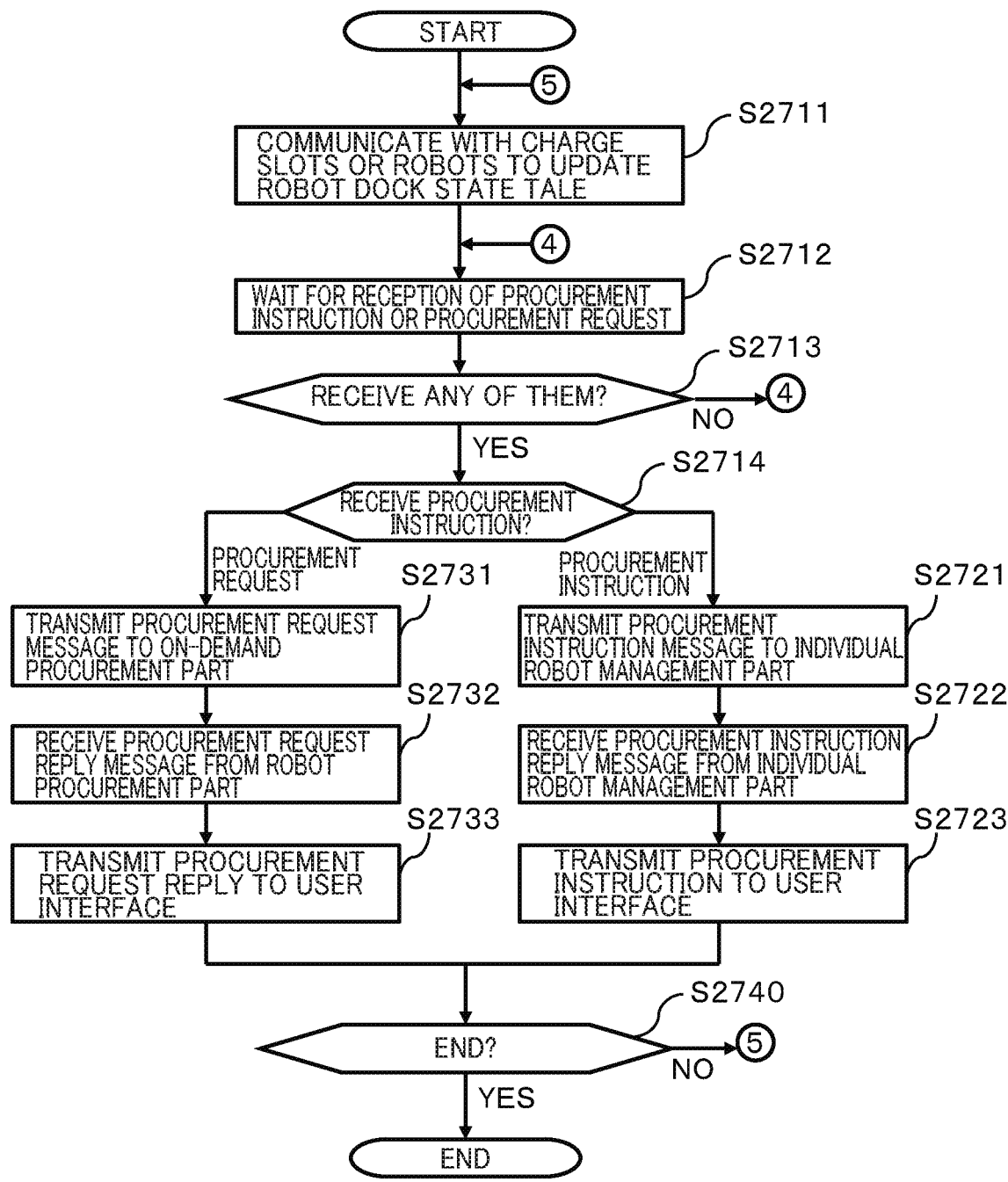
FIG. 27 is a flow chart illustrating a robot dock management process.

FIG. 27 is a flow chart illustrating a process to be performed by the robot dock management part of the robot dock management device 20 (hereinafter referred to as a robot dock management process S2700). The robot dock management process S2700 is described hereinafter with reference to FIG. 27.

The robot dock management part acquires information from the charging slots 41 or the robots 10 present in the robot dock through communications therewith via the communication device 24, and updates the robot dock state table 231 with the acquired information (S2711).
[S173]

Then, the robot dock management part waits for reception of the procurement instruction or the procurement request (S2712).

When receiving the procurement instruction or the procurement request (S2713: YES), the robot dock management part performs different processes depending on the received information. When the robot dock management part receives the procurement instruction (S2714: Procurement instruction), the process proceeds to S2721. On the other hand, when the robot dock management part receives the procurement instruction reply message M4 from the individual robot management part (S2722), the robot dock management part transmits the procurement instruction reply to the user interface 25 (S2723). Then, the process proceeds to S2740.

In S2731, the robot dock management part decodes the procurement request and transmits the procurement request message M1 to the on-demand procurement part. Then, when receiving the procurement request reply message M2 from the on-demand procurement part (S2732), the robot dock management part transmits a procurement request reply to the user interface 25 (S2733). Then, the process proceeds to S2740.

In S2740, the robot dock management part determines whether or not to terminate the robot dock management process S2700 (S2740). If the robot dock management part determines not to terminate (S2740: NO), the process returns to S2711. When the robot dock management part determines to terminate (S2740: YES), the robot dock management process 2700 ends. Furthermore, when sensing occurrence of an event that terminates the robot dock management process S2700 (such as reception of a termination signal from outside), for example, the robot dock management part determines to terminate the robot dock management process S2700.

Figure 28:
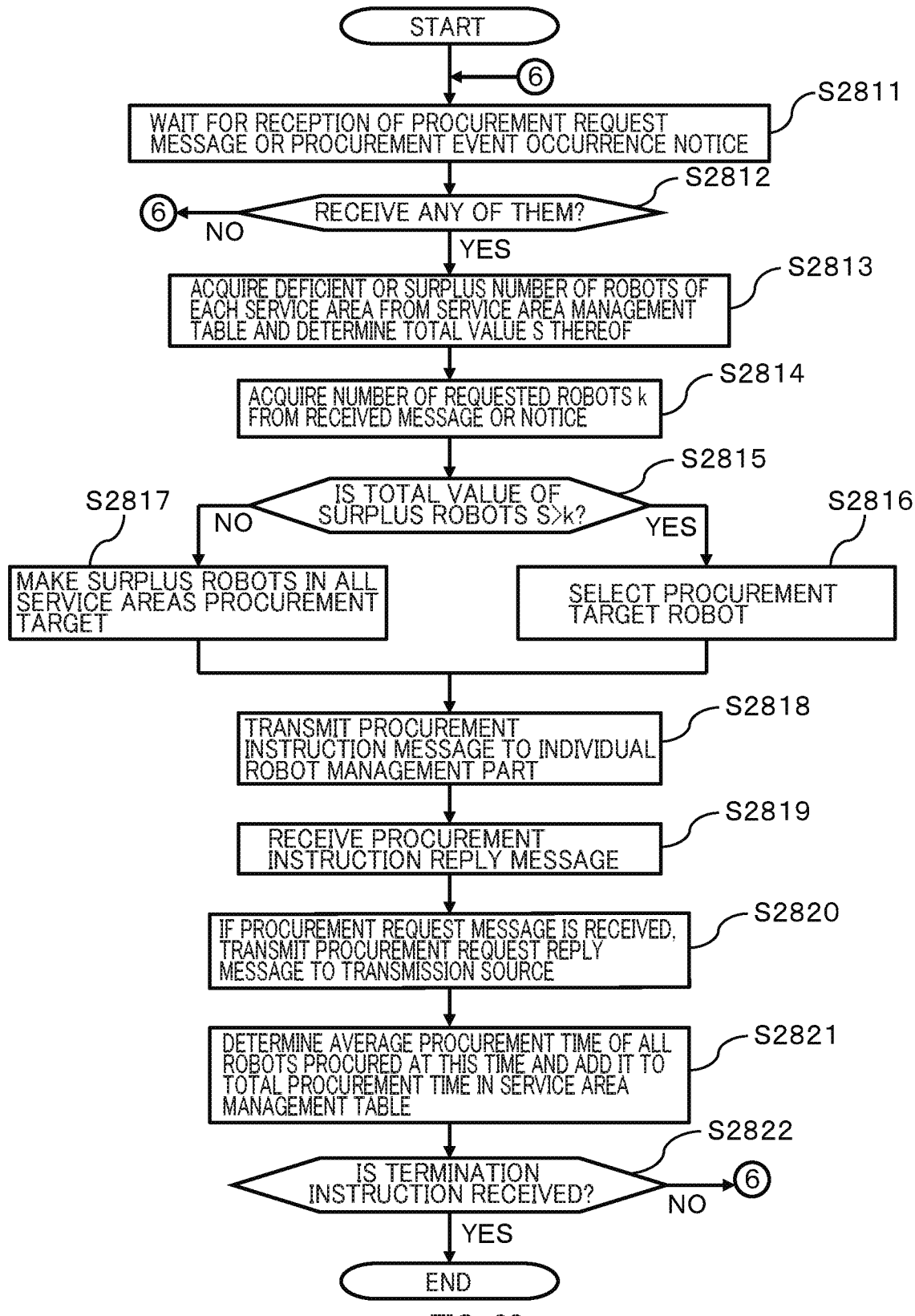
FIG. 28 is a flow chart illustrating an on-demand procurement process.

FIG. 28 is a flow chart illustrating a process to be performed by the on-demand procurement part of the robot procurement apparatus 30 (hereinafter referred to as an on-demand procurement process S2800).

The on-demand procurement part waits for reception of the procurement request message M1 or the event occurrence notice (S2812: NO). When receiving either the procurement request message M1 or the event occurrence notice (S2812: YES), the process proceeds to S2813.

In S2813, the on-demand procurement part acquires the deficient or surplus numbers of robots in the respective service areas 2 from the service area management table 331 to determine a total value of the deficient or surplus numbers of robots of all the service areas 2 (hereinafter expressed as a total value S).

Then, the on-demand procurement part decodes the received procurement request message M1 or the event occurrence notice to acquire the number of robots 10 being requested (hereinafter expressed as a requested number k) (S2814).

Then, the on-demand procurement part compares the total value S with the number of requested robots 10 $k$ (S2815). If the total value S of the surplus robots exceeds the requested number k (S2815: YES), the process proceeds to S2816. The total value S of the surplus robots is equal to or smaller than the requested number k (S2815: NO), the process proceeds to S2817.

In S2816, the on-demand procurement part selects the surplus robots 10 from the service area 2 having the surplus robots 10, as the procurement target. Then, the process proceeds to S2818. Furthermore, the method of selection described above is not limited, in particular. For example, the on-demand procurement part sequentially selects the procurement target robots 10 from the service areas 2 which each have the surplus robots 10 (which may include the dispatch destination service area 2) in acceding order of the distance to the dispatch destination service area 2. In this manner, sequentially selecting the procurement target robots 10 from the service areas 2 in the acceding order of the distance to the dispatch destination service area 2 can shorten the procurement time and enable a quick start of service provision. In addition, for example, the on-demand procurement part sequentially selects the procurement target robots 10 from the service areas 2 in descending order of the number of surplus robots. In this manner, sequentially selecting the procurement target robots 10 from the service areas 2 in the descending order of the number of surplus robots enables efficient utilization of the surplus robots across the entire service areas. In addition, when sequentially selecting the procurement target robots 10, the on-demand procurement part prioritizes the robots 10 in descending order of the battery level among the robots 10 that are stand-by or being charged. In this manner, sequentially selecting the procurement target robots 10 in the descending order of the battery level can reduce a possibility that the procured robot 10 will be disabled from providing service due to low battery charge.

On the other hand, in S2817, the on-demand procurement part makes all of the surplus robots present in the service areas 2 the procurement target. Then, the process proceeds to S2818.

In S2818, the on-demand procurement part transmits the procurement instruction message M3 to the individual robot management part. Then, the on-demand procurement part receives the procurement instruction reply message M4 from the individual robot management part (S2819).

Then, when receiving the procurement request message M1 in S2812, the on-demand procurement part transmits the procurement request reply message M2 to the transmission source (mobile terminal 7 or robot dock management part) (S2820).

Then, the on-demand procurement part determines average time of the procurement time of all the robots 10 reserved at this time (hereinafter referred to as average procurement time), and updates the total procurement time 621 of the dispatch destination service area 2 in the service area management table 331 (adds the average procurement time to the total procurement time 621 before update) (S2824).

In S2822, the on-demand procurement part determines whether or not to terminate the on-demand procurement process S2800. If the on-demand procurement part determines not to terminate (S2822: NO), the process returns to S2811. If the on-demand procurement part determines to terminate (S2822: YES), the on-demand procurement process S2800 ends. Furthermore, when sensing occurrence of an event that terminates the on-demand procurement process S2800 (such as reception of a termination signal from outside), for example, the on-demand procurement part determines to terminate the on-demand procurement process S2800.

Figure 29:
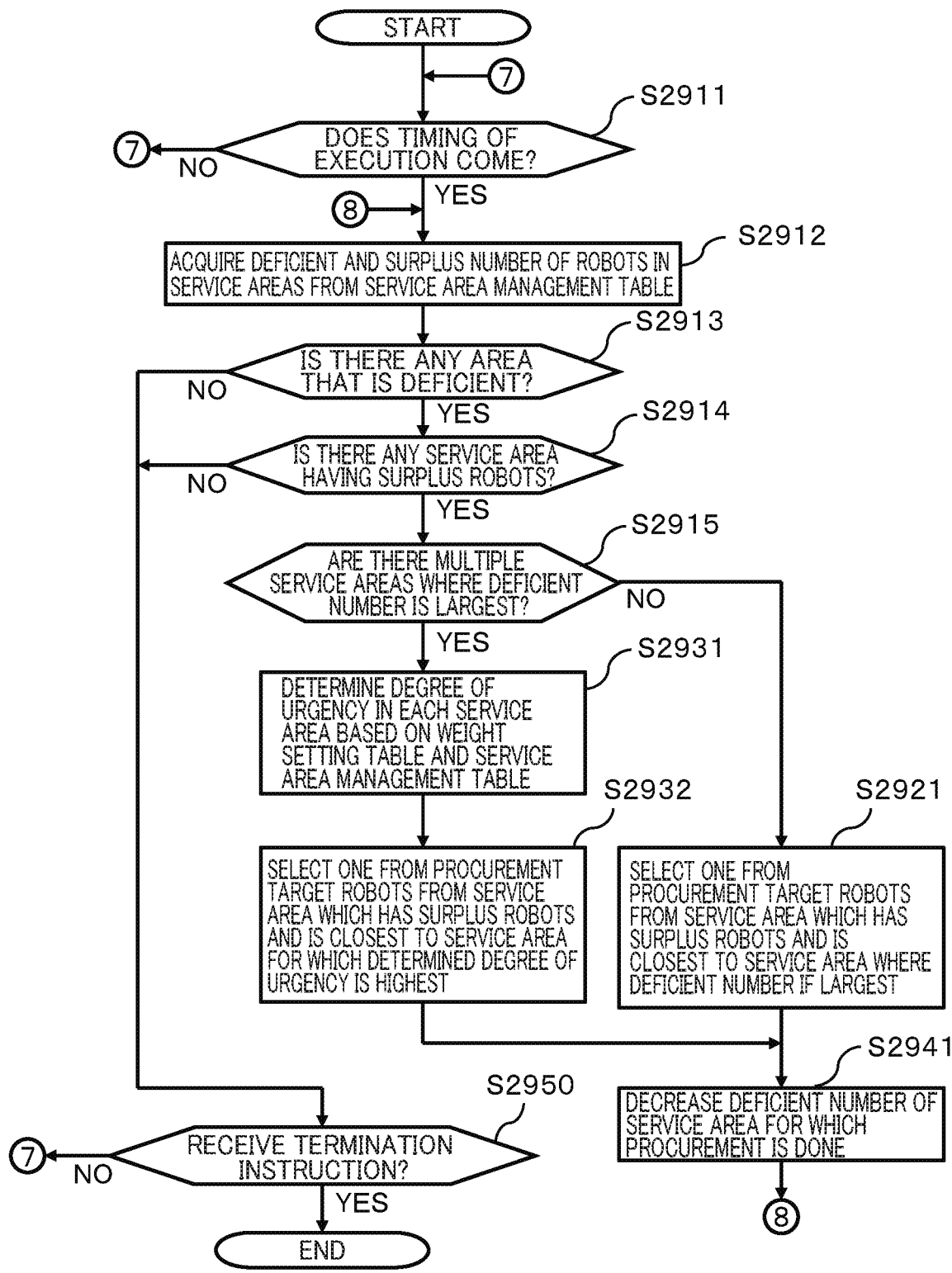
FIG. 29 is a flow chart illustrating a non-on-demand procurement process.

FIG. 29 is a process to be performed by the non-on-demand procurement part of the robot procurement apparatus 30 (hereinafter referred to as a non-on-demand procurement process S2900). The non-on-demand procurement process S2900 is described hereinafter with reference to FIG. 29.

The non-on-demand procurement part waits for timing of implementing active procurement (non-on-demand procurement process) to come (S2911: NO). Furthermore, the above timing comes when any of the load ratios in the service areas 2 exceeds a preset threshold or when the current time reaches preset time. When the above timing comes (S2911: YES), the process proceeds to S2912.

In S2912, the non-on-demand procurement part acquires the deficient or surplus numbers of robots 624 in the service areas 2 from the service area management table 331 in order to know the latest conditions in the service areas 2.

Then, the non-on-demand procurement part determines whether or not there is the service area 2 that is deficient in the robots 10 (S2913). If there is no service area 2 that is deficient in the robots 10 (S2913: NO), the process proceeds to S2950. If there is the service area 2 that is deficient in the robots 10 (S2913: YES), the process proceeds to S2914. In S2914, referring to the deficient or surplus number of robots acquired in S2912, the non-on-demand procurement part determines whether or not there is the service area 2 having the surplus robots 10. If there is no service area 2 having the surplus robots 10 (S2914: NO), the process proceeds to S2950. If there is the service area 2 having the surplus robots 10 (S2914: YES), the process proceeds to S2915.

In S2915, referring to the deficient or surplus number of robots acquired in S2912, the non-on-demand procurement part determines whether or not there are more than one service area 2 where the deficient number is largest. If there is only one service area 2 where the deficient number is largest (S2915: NO), the process proceeds to S2921. If there is more than one service area 2 that is most deficient in the number of robots 10 (S2915: YES), the process proceeds to S2913.

In S2921, the non-on-demand procurement part selects one of the robots 10 from the service area 2 that has the surplus robots 10 and is closest to the service area 2 where the deficient number is largest, and transmits the procurement request message M3 to the individual robot management part. Then, the process proceeds to S2941.

On the other hand, in S2931, the non-on-demand procurement part determines the degree of urgency for each of the service area where the deficient number is largest, based on the weight setting table 334 and the service area management table 331. Then, the non-on-demand procurement part selects one of the procurement target robots 10 from the service area 2 which has the surplus robots 10 and is closest to the service area 2 for which the determined degree of urgency is highest, and transmits the procurement instruction message M3 to the individual robot management part (S2932). Then, the process proceeds to S2941.

In S2941, the non-on-demand procurement part decreases the deficient number of the deficient or surplus number of robots 624 in the service area management table 331 by 1 (more specifically, adds 1 to the deficient or surplus number of robots 624). Then, the process returns to S2912.

In S2950, the non-on-demand procurement part determines whether or not to terminate the non-on-demand procurement process S2900. If the non-on-demand procurement part determines not to terminate (S2950: NO), the process returns to S2911. If the non-on-demand procurement part determines to terminate (S2950: YES), the non-on-demand procurement process S2900 ends. Furthermore, when sensing occurrence of an event that terminates the non-on-demand procurement process S2900 (such as reception of a termination signal from outside), for example, the non-on-demand procurement part determines to terminate the non-on-demand procurement process S2900.

As described above, since the robot procurement apparatus 30 determines the procurement target robots 10 based on the deficient or surplus number of robots 10 in the service areas 2 of the dispatch destination and the deficient or surplus number of robots 10 in any service area 2 other than the dispatch destination service area 2, the robot procurement apparatus 30 can efficiently operate the robots 10 while ensuring the quality of services by the robots 10 across the entire service areas 2.

Incidentally, it is needless to say that the present invention is not limited to the embodiments described above, and may be changed in various ways without departing from its intent. For example, the above embodiments are described in detail to describe the present invention in an easily understood manner, and not necessarily limited to those having all configurations described above. In addition, it is possible to add, delete, or replace other configuration for some of the configurations of the above embodiments.

In addition, some or all of the configurations, functional units, processing means, or the like, as described above may be implemented by hardware by, for example, designing an integrated circuit. In addition, the configurations, functions, or the like as described above may be implemented by software by a processor interpreting a program for implementing and executing the functions. Information on the program, tables, files, or the like that implement the functions may be stored in a storage device such as a memory or a hard disk, a solid-state drive (SSD) or in a storage medium such as an IC card, an SD card, a DVC, or the like.

In addition, in each of the figures described above, the control lines and the information lines that are necessary for explanation are illustrated, and not all of the control lines or information lines on the implementation are always illustrated. For example, it may be believed that in practice, almost all the configurations are coupled to each other.

In addition, arrangements of various types of functional units, various types of processing parts, various types of databases of the robot management system 1 as described above are simply an example. The arrangements of various types of functional units, various types of processing parts, various types of databases may be changed in terms of performance, processing efficiency, communication efficiency, or the like, of hardware or software that the robot management system 1 is equipped with.

In addition, the configuration (schema or the like) of the database described above may be flexibly changed in terms of efficient utilization of resources, improved processing efficiency, improved access efficiency, improved search efficiency, or the like.

Although the present disclosure has been described with reference to exemplary embodiments, those skilled in the art will recognize that various changes and modifications may be made in form and detail without departing from the spirit and scope of the claimed subject matter.

What is claimed is:

1. A robot procurement apparatus comprising:
a memory configured to store a deficient number of a plurality of robots or a surplus number of the plurality of robots in each of multiple service areas where the plurality of robots provide services; and
a processor communicatively coupled to the memory, wherein the processor is configured to
acquire the deficient number of the plurality of robots or the surplus number of the plurality of robots in each of the multiple service areas,
calculate a total deficient number or a total surplus number of the plurality of robots in all of the multiple service areas, receive a procurement request from a dispatch destination service area, the procurement request contains at least a total number of robots being requested, compares the total number of robots being requested with the calculated total deficient number or the total surplus number of the plurality of robots in all of the multiple service areas, when the calculated total surplus number of the plurality of robots in all of the multiple service areas is greater than the total number of robots being requested the processor selects a number of procurement target robots from at least one of the multiple service areas, the at least one of the multiple service areas contains the surplus number of the plurality of robots which is greater than the total number of robots being requested, when the calculated total surplus number of the plurality of robots in all of the multiple service areas is less than the total number of robots being requested the processor selects as the number of procurement target robots, a respective surplus number of the plurality of robots from each of the multiple service areas that each contains a surplus number of the plurality of robots, and dispatches the number of procurement robots to the dispatch destination service area, wherein the dispatch destination service area is one service area of the multiple service areas to which at least one of the plurality of robots is to be dispatched based on the total deficient number of the plurality of robots in the dispatch destination service area and the total surplus number of the plurality of robots in any of the multiple service areas other than the dispatch destination service area, and wherein the number of procurement target robots is equal to the total number of robots being requested by the dispatch destination service area.

2. The robot procurement apparatus according to claim 1, wherein the processor is further configured to calculate the surplus number of the plurality of robots in each of the multiple service areas based on load of the plurality of robots in each of the multiple service areas.

3. The robot procurement apparatus according to claim 1, wherein the processor determines which of the multiple service areas to dispatch the number of procurement target robots by prioritizing a robot present in one of the multiple service areas close to the dispatch destination service area among other of the multiple service areas where surplus robots are present.

4. The robot procurement apparatus according to claim 1, wherein the processor determines which of the multiple service areas to dispatch the number of procurement target robots by prioritizing a robot present in one of the multiple service areas where a large number of the surplus robots are present.

5. The robot procurement apparatus according to claim 1, wherein the processor determines which of the multiple service areas to dispatch the number of procurement target robots by prioritizing a robot having high battery level among the surplus robots.

6. The robot procurement apparatus according to claim 1, wherein the processor selects a charged robot present in a robot dock configured to charge a robot, as a candidate for the number of procurement target robots.

7. The robot procurement apparatus according to claim 1, wherein the processor is configured to communicate via a network, and the processor receives the procurement request or an event occurrence notice.

8. The robot procurement apparatus according to claim 7, wherein a camera connected to the network transmits, to the processor, the event occurrence notice based on shot images of states in the multiple service areas.

9. The robot procurement apparatus according to claim 7, wherein a robot communicatively coupled to the network transmits the event occurrence notice based on a signal outputted from a sensor to the processor.

10. The robot procurement apparatus according to claim 7, wherein an information processor communicatively coupled to the network transmits the procurement request based on an instruction received through a user interface, to the processor.

11. The robot procurement apparatus according to claim 10, wherein the information processor is installed in a robot dock configured to charge at least one of the plurality of robots.

12. The robot procurement apparatus according to claim 3, wherein if there is a service area among the multiple service areas that is deficient in the plurality of robots and there is a different service area among the multiple service areas where the surplus robots are present, the processor calculates the total deficient number and the total surplus number of the plurality of robots in all of the multiple service areas.

13. The robot procurement apparatus according to claim 12, wherein if there are a plurality of service areas among the multiple service areas that are each deficient in the plurality of robots, the processor determines a degree of urgency for each of the plurality of service areas that are deficient in the plurality of robots and determines procurement target robots preferentially for each of the plurality of service areas in descending order of the degree of urgency.

14. The robot procurement apparatus according to claim 13, wherein the processor determines the degree of urgency by using as a parameter at least any of battery consumption of robots in each of the plurality of service areas that are deficient in the plurality of robots, size of load of the plurality of robots, procurement time of the plurality of robots, and priority set for each of the plurality of service areas.

15. The robot procurement apparatus according to claim 14, wherein the memory stores a weight coefficient set for each of the parameters, and the processor determines the degree of urgency by weighting the parameters with the weight coefficients.

16. The robot procurement apparatus according to claim 1, wherein each of the plurality of robots comprises a different processor that controls each of the plurality of robots according to an instruction sent from the processor, and the processor transmits an instruction to move to the dispatch destination to the at least one of the plurality of robots determined to be the procurement target.

17. A robot procurement method implemented by an information processor, comprising:
   storing, via a memory, a deficient number of a plurality of robots or a surplus number of a plurality of robots in each of a plurality of service areas where the plurality of robots provide services;
   acquiring, from the memory, the deficient number of the plurality of robots or the surplus number of the plurality of robots in each of the multiple service areas,
   calculating, via the information processor, a total deficient number or a total surplus number of the plurality of robots in all of the multiple service areas,
   receiving, via the information processor, a procurement request from a dispatch destination service area, the procurement request contains at least a total number of robots being requested,
   comparing, via the information processor, the total number of robots being requested with the calculated total deficient number or the total surplus number of the plurality of robots in all of the multiple service areas,
   when the calculated total surplus number of the plurality of robots in all of the multiple service areas is greater than the total number of robots being requested the processor selects a number of procurement target robots from at least one of the multiple service areas, the at least one of the multiple service areas contains the surplus number of the plurality of robots which is greater than the total number of robots being requested,
   when the calculated total surplus number of the plurality of robots in all of the multiple service areas is less than the total number of robots being requested the processor selects as the number of procurement target robots, a respective surplus number of the plurality of robots from each of the multiple service areas that each contains a surplus number of the plurality of robots, and
   dispatching, via the information processor, the number of procurement robots to the dispatch destination service area,
   wherein the dispatch destination service area is one service area of the multiple service areas to which at least one of the plurality of robots is to be dispatched based on the total deficient number of the plurality of robots in the dispatch destination service area and the total surplus number of the plurality of robots in any of the multiple service areas other than the dispatch destination service area, and
   wherein the number of procurement target robots is equal to the total number of robots being requested by the dispatch destination service area.

18. The robot procurement method according to claim 17, further comprising, by the information processor, calculating the surplus number of the plurality of robots in each of the multiple of service areas based on load of the plurality of robots in each of the multiple service areas.

* * * * *